United States Patent
Smialek et al.

(10) Patent No.: US 8,209,661 B2
(45) Date of Patent: Jun. 26, 2012

(54) PARSER, CODE GENERATOR, AND DATA CALCULATION AND TRANSFORMATION ENGINE FOR SPREADSHEET CALCULATIONS

(75) Inventors: Michael R. Smialek, Glenview, IL (US); Michael H. Rubin, Evanston, IL (US)

(73) Assignee: Knowledge Dynamics, Inc., Glenview, IL (US)

( * ) Notice: Subject to any disclaimer, the term of this patent is extended or adjusted under 35 U.S.C. 154(b) by 115 days.

(21) Appl. No.: 12/901,875

(22) Filed: Oct. 11, 2010

(65) Prior Publication Data

US 2011/0055681 A1 Mar. 3, 2011

Related U.S. Application Data

(63) Continuation of application No. 11/301,734, filed on Dec. 12, 2005, now Pat. No. 7,836,425, which is a continuation of application No. 10/222,730, filed on Aug. 15, 2002, now Pat. No. 7,010,779.

(60) Provisional application No. 60/312,981, filed on Aug. 16, 2001.

(51) Int. Cl.
*G06F 9/44* (2006.01)

(52) U.S. Cl. ........ 717/106; 717/102; 717/110; 715/212; 715/219; 715/220

(58) Field of Classification Search ........................ None
See application file for complete search history.

(56) References Cited

U.S. PATENT DOCUMENTS

| | | | |
|---|---|---|---|
| 4,815,029 A | 3/1989 | Barker et al. | |
| 4,989,141 A | 1/1991 | Lyons et al. | |
| 5,021,973 A | 6/1991 | Hernandez et al. | |
| 5,241,620 A | 8/1993 | Ruggiero | |
| 5,317,686 A | 5/1994 | Salas et al. | |
| 5,339,410 A | 8/1994 | Kanai | |
| 5,359,724 A | 10/1994 | Earle | |
| 5,371,675 A * | 12/1994 | Greif et al. | .................... 715/220 |
| 5,394,347 A | 2/1995 | Kita et al. | |
| 5,428,712 A | 6/1995 | Elad et al. | |
| 5,499,371 A | 3/1996 | Henninger et al. | |
| 5,577,188 A | 11/1996 | Zhu | |
| 5,598,519 A | 1/1997 | Narayanan | |
| 5,623,591 A | 4/1997 | Cseri | |

(Continued)

OTHER PUBLICATIONS

Title: Individual and group spreadsheet design: patterns of errors, author: Panko et al, source: IEEE, dated: Jan. 4, 1994.*

(Continued)

*Primary Examiner* — Chameli Das
(74) *Attorney, Agent, or Firm* — Brinks Hofer Gilson & Lione

(57) ABSTRACT

A system including spreadsheet sheets, makes calculations and data transformations, which is available through a programming interface, and conforms to the grammar and syntax of a target software development language is presented. The system includes an Object Model with Data Structures representing entities involved in spreadsheets. The system includes a Parser and Code Generator that extracts data from a body of spreadsheet data, instantiates instances of Data Structures of the Object Model to represent the spreadsheet data, parses the data and formulas contained in the cells of the spreadsheets, iterates through the instantiated instances of the Data Structures, and generates source code that performs the calculations and data transformations embodied in the spreadsheet data. The system includes a Calculation Engine with software base classes that implement the common structural and data access features of spreadsheet data, and further implement the operations of common spreadsheet functions and operators.

28 Claims, 26 Drawing Sheets

U.S. PATENT DOCUMENTS

| | | | |
|---|---|---|---|
| 5,721,847 A | | 2/1998 | Johnson |
| 5,729,745 A | * | 3/1998 | Reina et al. ............... 719/315 |
| 5,890,174 A | | 3/1999 | Khanna et al. |
| 5,893,123 A | | 4/1999 | Tuinenga |
| 5,905,498 A | | 5/1999 | Diament |
| 5,987,481 A | * | 11/1999 | Michelman et al. .......... 715/219 |
| 5,987,541 A | | 11/1999 | Hewitt |
| 6,202,099 B1 | | 3/2001 | Gillies et al. |
| 6,216,261 B1 | | 4/2001 | Mitchell |
| 6,237,136 B1 | | 5/2001 | Sadahiro |
| 6,249,786 B1 | | 6/2001 | Wadewitz |
| 6,249,794 B1 | | 6/2001 | Raman |
| 6,262,736 B1 | | 7/2001 | Nelson |
| 6,282,551 B1 | | 8/2001 | Anderson |
| 6,289,513 B1 | | 9/2001 | Bentwich |
| 6,317,750 B1 | | 11/2001 | Tortolani et al. |
| 6,339,838 B1 | | 1/2002 | Weinman |
| 6,389,434 B1 | | 5/2002 | Rivette et al. |
| 6,502,237 B1 | | 12/2002 | Yates et al. |
| 6,526,454 B2 | | 2/2003 | Williams et al. |
| 6,556,983 B1 | * | 4/2003 | Altschuler et al. ............ 706/55 |
| 6,613,098 B1 | | 9/2003 | Sorge et al. |
| 6,701,485 B1 | | 3/2004 | Igra et al. |
| 6,718,334 B1 | * | 4/2004 | Han ...................................... 1/1 |
| 6,766,512 B1 | * | 7/2004 | Khosrowshahi et al. ..... 717/140 |
| 6,859,907 B1 | * | 2/2005 | McGarry ....................... 715/201 |
| 6,988,241 B1 | * | 1/2006 | Guttman et al. .............. 715/220 |
| 7,120,866 B2 | * | 10/2006 | Kotler et al. .................. 715/209 |
| 7,418,440 B2 | * | 8/2008 | Kubaitis ................................ 1/1 |
| 7,421,648 B1 | * | 9/2008 | Davis ............................ 715/234 |
| 7,437,715 B2 | | 10/2008 | Chatsinchai et al. |
| 7,530,012 B2 | | 5/2009 | Medicke et al. |
| 7,587,665 B2 | | 9/2009 | Crow et al. |
| 7,613,641 B1 | | 11/2009 | Jenkins et al. |
| 7,721,270 B2 | | 5/2010 | Ukelson et al. |
| 8,060,518 B2 | * | 11/2011 | Timmons ...................... 707/755 |
| 2002/0069220 A1 | * | 6/2002 | Tran .............................. 707/503 |
| 2002/0082816 A1 | * | 6/2002 | Nguyen et al. .................. 703/13 |
| 2002/0103824 A1 | * | 8/2002 | Koppolu et al. ........... 707/501.1 |
| 2002/0129054 A1 | | 9/2002 | Ferguson et al. |
| 2003/0226105 A1 | | 12/2003 | Waldau |
| 2004/0205644 A1 | * | 10/2004 | Shaughnessy et al. ....... 715/530 |
| 2004/0225957 A1 | | 11/2004 | Egilsson |
| 2005/0034060 A1 | | 2/2005 | Kotler et al. |
| 2005/0050088 A1 | | 3/2005 | Kotler et al. |
| 2005/0066265 A1 | * | 3/2005 | Kotler et al. .................. 715/503 |
| 2005/0268215 A1 | | 12/2005 | Battagin et al. |
| 2006/0187048 A1 | * | 8/2006 | Curkendall et al. ....... 340/572.4 |
| 2007/0061698 A1 | | 3/2007 | Megiddo et al. |
| 2009/0083615 A1 | | 3/2009 | Kotler et al. |

OTHER PUBLICATIONS

Title: An experimental study of spreadsheet presentation and error detection, author: Galletta, D.F et al, source: IEEE,Jan. 3, 1996.*

Reichwein et al., "Slicing Spreadsheets: An Integrated Methodology for Spreadsheet testing and Debugging", ACM, 1999.

Fuller et al., "The design of an object oriented collaborative spreadsheet with version control and history management", ACM, 1993.

* cited by examiner

FIG. 2

```
package kd.app.sampleGeneratedCode;

import kdyn.calc.*;

public class SampleWorkbookBook extends Workbook
{
    OutcomesSheet outcomesSheet = new OutcomesSheet(this, 1, "OutcomesSheet");

public SampleWorkbookBook()
    {
        //default active sheet to point to first sheet
        setSheet(1);

/* Name Declarations */ addNamedCell("NamedCell", outcomesSheet.C5);
        addNamedRange("NamedRange", outcomesSheet.C7, outcomesSheet.C8);
    }
}
```

FIG. 4A

```
package kd.app.sampleGeneratedCode;

import kdyn.calc.*;

/** Code for: Outcomes Sheet , Range: C5, C13 */
public class OutcomesSheet extends WorkSheet
{
    private SampleWorkbookBook mBk;
    /* Cell Declarations */
    C C5=new C(5,3, this, false, 11);
    C C7=new C(7,3, this, false, 13);
    C C8=new C(8,3, this, false, 17);
    C C10=new C(10,3, this, false, 30);

/* Worksheet Constructor */
    public OutcomesSheet(SampleWorkbookBook wkb, int position, String name)
    {
        super(wkb, position, name);
        mBk = wkb;
    }

/* Cell Formulae */
    public Value C13e()
    {return kdcAvg(new KDCalcObject[]  {  opAdd(v(12),
                                                C8.v(),
                                                C5.v(),
                                                kdcSum(new KDCalcObject[] {r(2, 7, 3, 8, 3)}),
                                                C10.v()
                                          });
    }
}
```

FIG. 4B

```
=AVERAGE(12+C8, NamedCell, SUM(NamedRange), C10)
```

```
public Value C13e()
{ return kdcAvg(new KDCalcObject[] { opAdd(v(12),
                                            C8.v()),
                                     C5.v(),
                                     kdcSum(new KDCalcObject[]{ r(2, 7, 3, 8, 3) }),
                                     C10.v()
                                   });
}
```

FIG. 4C

| Formula | Result | | Function | Arg1 | Arg2 | Arg3 | Arg4 | Arg5 |
|---|---|---|---|---|---|---|---|---|
| ARITHMETIC RA... | | | | | | | | |
| count(10000) | 3 | | count | 10000 | 1000 | 0 | FALSE | TRUE |
| count(1312) | 2 | | count | 1312 | sample | 100 | FALSE | TRUE |
| count(sample) | 0 | | count | sample | sample | sample | sample | sample |
| count() | 0 | | count | | | | | |
| count(TRUE) | 0 | | count | TRUE | TRUE | FALSE | FALSE | TRUE |
| count(10000) | 5 | | count | 10000 | 1000 | 100 | 10 | 1 |
| count(TRUE) | 1 | | count | TRUE | 1000 | 100 | | |
| count(FALSE) | 1 | | count | FALSE | 1000 | | | |
| count(10000) | 2 | | count | 10000 | 1000 | 1000 | | |
| count() | 0 | | count | #N/A | | | | |
| #DIV/0! | 0 | | count | #DIV/0! | | | | |

Fig. 5

PARSER, CODE GENERATOR, AND DATA CALCULATION AND TRANSFORMATION ENGINE FOR SPREADSHEET CALCULATIONS

REFERENCE TO RELATED APPLICATIONS

This application is a continuation under 37 C.F.R. §1.53(b) of U.S. patent application Ser. No. 11/301,734 filed Dec. 12, 2005 now U.S. Pat. No. 7,836,425, which is a continuation of Ser. No. 10/222,730 filed on Aug. 15, 2002, now U.S. Pat. No. 7,010,779, which claims the benefit of the filing date under 35 U.S.C. §119(e) of U.S. Provisional Application Ser. No. 60/312,981 filed Aug. 16, 2001, the entire disclosures of which is hereby incorporated by reference.

FIELD OF THE INVENTION

The present invention pertains in general to software based calculation and data transformation engines, and more particularly, to conversion of the calculation and data transformation features of spreadsheet data into source code of a target software development language for independent runtime execution.

BACKGROUND

Spreadsheet applications for computers, such as IBM's Lotus 123® and Microsoft® Excel, have become very popular analysis and communication tools. Spreadsheets are typically used to perform numerical analyses and 'what if' analyses, to simulate complex systems, and to communicate ideas. Many users are familiar with the spreadsheet metaphor. With little or no training, users can create complex, interrelated calculations and data transformations in spreadsheet applications.

The rapid growth and adoption of the Internet has spawned an explosion in web-based distribution of application functionality and server-based applications. Many such distributed and server-based applications have underlying logic that comprises complex calculations and data transformations. Development of such functionality in software language source code can be effort intensive, tedious, and error-prone. Furthermore, creating such functionality requires highly skilled software developers.

Being able to embed the calculations and data transformations of a spreadsheet directly into stand-alone applications, distributed applications, and server-based applications can be very powerful. Some spreadsheet applications have application programming interfaces (APIs) that allow them to provide calculation and data transformation as a service to other applications. But distributing and using spreadsheets in this way requires that users have the same or a compatible spreadsheet application as the one in which the spreadsheet was created.

Using spreadsheet applications as calculation engines in server-based applications also has limitations. Background art spreadsheet applications are meant for single users and cannot scale to support high-volume server-side processing. Also, the User Interface and display features of spreadsheet applications carry significant overhead.

There are background art spreadsheet components available that can read and write spreadsheet data created by popular spreadsheet applications and perform calculations at runtime. These components do facilitate the integration of spreadsheet functionality into other distributed applications or server-based applications. But these components operate internally in the same way spreadsheet applications do: they interpret Cell formulas at runtime. Runtime interpretation of Cell formulas is generally considered to be a desirable feature because it allows Cell formulas to be changed at runtime. But in many application scenarios, calculations and data transformations need to remain unchanged at runtime. So when a spreadsheet component is used as a calculation engine in such an application, then the runtime Cell formula interpretation feature adds memory and processing overhead without adding any value. Background art spreadsheet components are typically larger than 1 Megabyte in size.

When using background art spreadsheet components in server-based applications, the overhead associated with the User Interface and runtime cell formula interpretation features can negatively impact server performance, both from processing speed and memory usage standpoints. When using background art spreadsheet components in distributed applications, the overhead can also significantly degrade download performance.

Some spreadsheet applications and spreadsheet components use mechanisms to represent simple cell formulas as machine code during idle time processing. While this can reduce the negative performance impact related to run-time cell formula interpretation, it maintains the memory overhead and it can limit the spreadsheet application or spreadsheet component to running on only a single platform.

It would be desirable to provide a facility for automatically generating source code from spreadsheet data such that the generated source code embodies the calculations and data transformations embodied in the spreadsheet data. The generated source code may then be integrated into a wide variety of different types of applications or other utilization mechanisms. The calculations and data transformation may allow features to be accessed by users who do not have a spreadsheet application or spreadsheet component, or who have a spreadsheet application or spreadsheet component that is incompatible with the original spreadsheet application. The calculations and data transformation may protect features from being modified accidentally or deliberately. Thus, spreadsheet applications may be used as design tools for creating and testing complex, interrelated calculation functionality for use in a wide variety of applications. The calculations and data transformation allows features to be embedded into high-volume server architectures, such as mainframe computers or super computers, that are not fully supported by background art spreadsheet applications or components. Moreover, the calculations and data transformation may allow features to be embedded into disparate or distributed computing environments, such as web-browsers, embedded systems, gaming consoles, cell phones, and personal digital assistants (PDAs), that are not fully supported by background art spreadsheet applications or components.

One of the most labor-intensive aspects of software development is testing to verify that the software meets specifications. In many software development efforts, major parts of the system must be built before any of the parts can be tested. This makes it difficult to localize the origin of errors. But when using a spreadsheet to develop the core logic of a system it is easy to create multiple sets of test data and switch between the sets to test the spreadsheet. Therefore, it would be desirable to provide a core functionality that can be verified locally, before deployment and without writing any code.

SUMMARY

Developing complex logic in a spreadsheet is much more efficient than hand-coding in a software language. The visual nature of spreadsheets and usability features like drag-copy have been critical to their widespread adoption. When these productivity enhancers are applied to programming, the effects are no less dramatic. Developers can create calculations and data transformation routines in a spreadsheet in a fraction of the time that it takes to do the same in code. Sophisticated systems may incorporate with built-in functions. Beginning developers can be effective at coding logic that might otherwise require a very skilled resource.

Briefly summarized, the present invention relates to source code generator programming interfaces defined to facilitate the analysis of a body of spreadsheet data and the generation of software source code representative of the body of spreadsheet data. The generated software source code embodies structural aspects of the body of spreadsheet data. The calculations and data transformations are performed thorough a plurality of spreadsheet sheets. This makes the calculations and data transformations available through a programming interface. Further, the grammar and syntax is conformed to a target software development language.

A preferred embodiment of the Parser and Code Generator integrated directly into a spreadsheet application. The preferred embodiment optionally generates source code conforming to the syntax of multiple target software development languages, including Java® by Sun Microsystems, C, C++, and others.

BRIEF DESCRIPTION OF THE DRAWINGS

Figure 2:
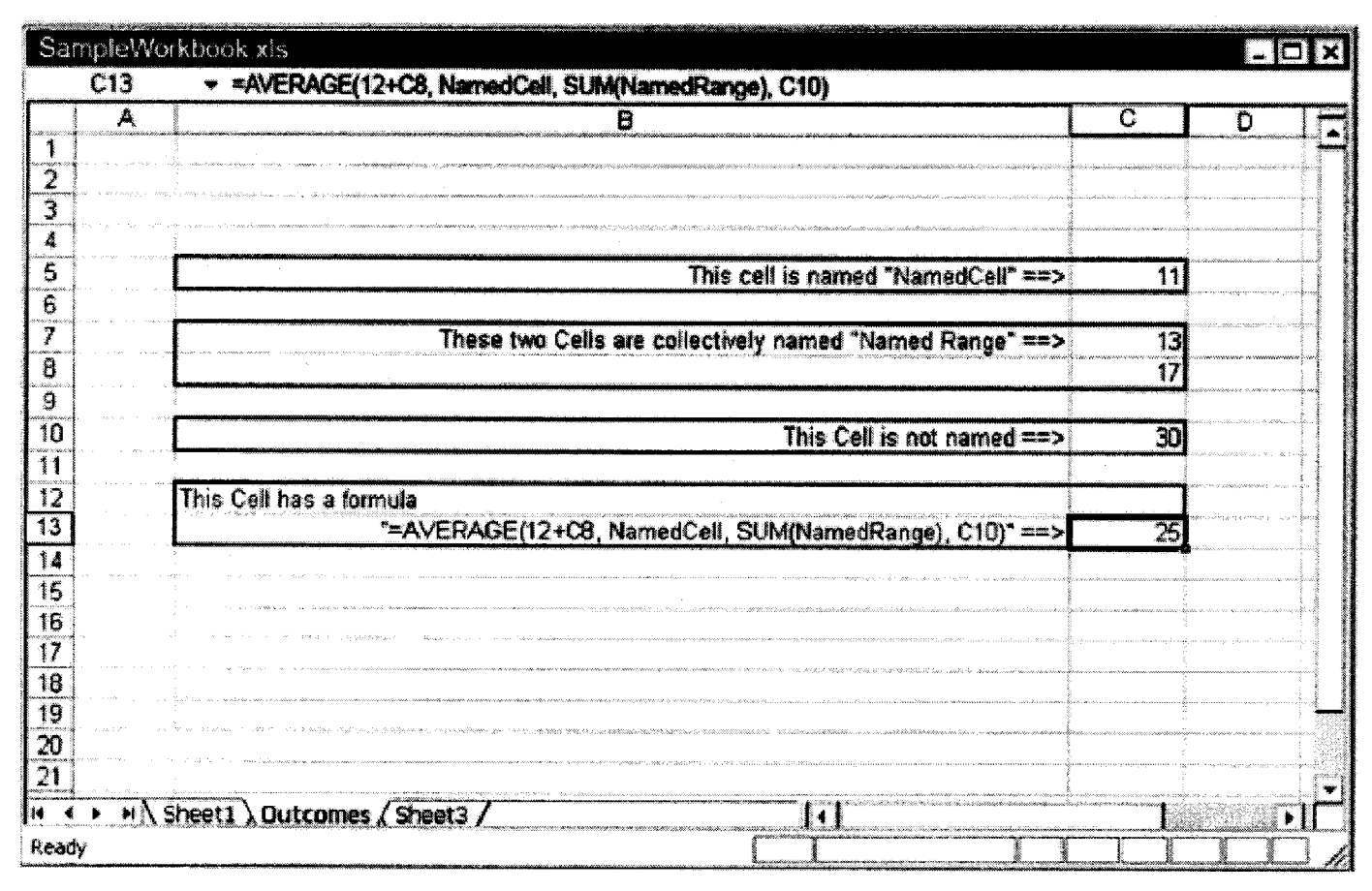

FIG. 2 shows a screen shot of a representative spreadsheet application in accordance with a preferred embodiment;

FIG. 4a is a sample generated source code representative of global aspects of a body of spreadsheet data;

FIG. 4b is a screen shot of generated source code representative of aspects of a single spreadsheet sheet;

FIG. 4c is a sample representative spreadsheet cell formula and representative generated code;

FIG. 5 is a sample representative spreadsheet-like application interfacing with the Calculation Engine for values from an underlying compiled module representative of a body of spreadsheet data to provide calculation and data transformation features of the represented spreadsheet;

DETAILED DESCRIPTION OF THE DRAWINGS AND PRESENTLY PREFERRED EMBODIMENTS

Figure 1:
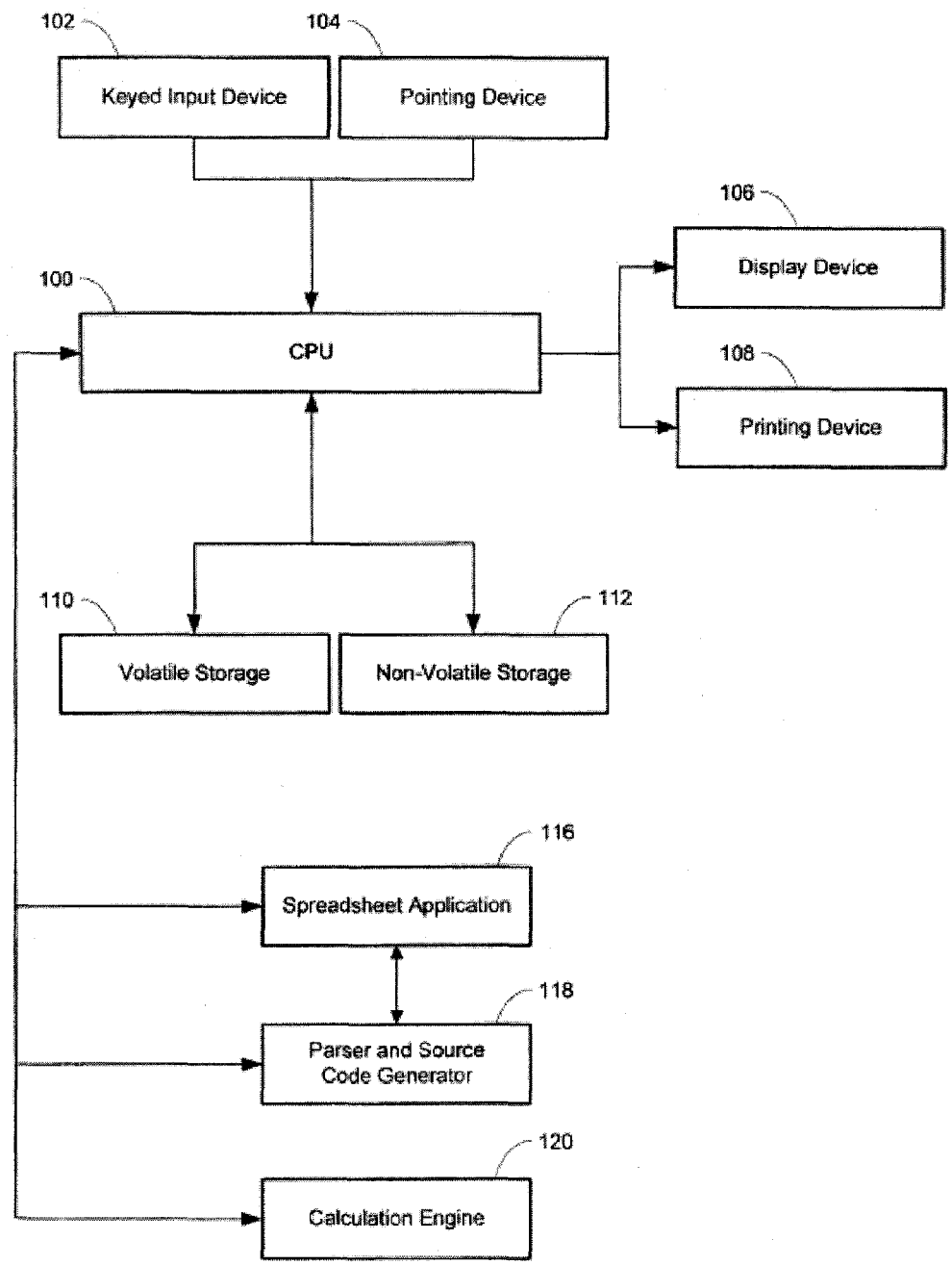
FIG. 1 shows a diagram of representative computer system hardware in accordance with a preferred embodiment.
Figure 3:
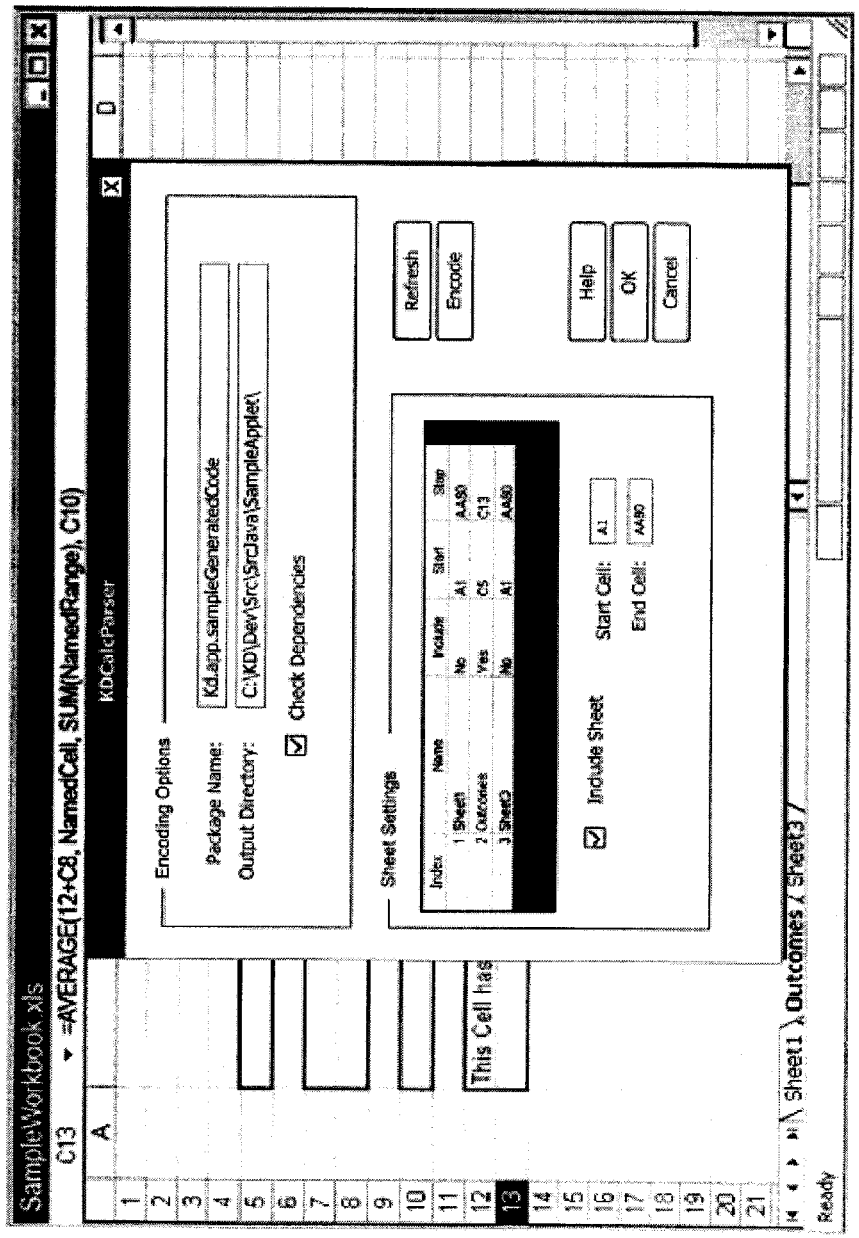
FIG. 3 shows a screen shot of a control interface displaying user-configurable properties integrated directly into a spreadsheet application, in this case Microsoft® Excel in accordance with the invention.
Figure 6:
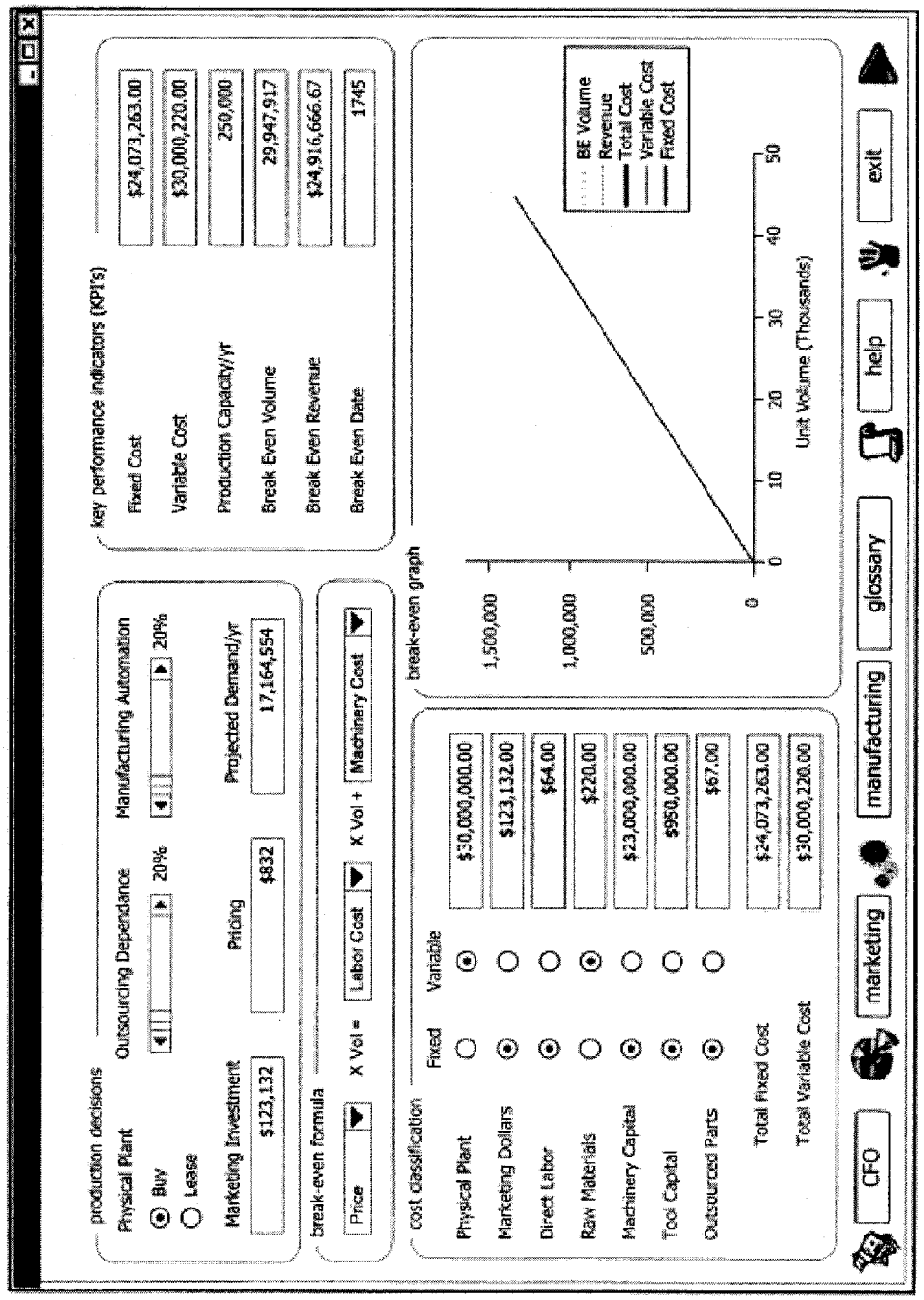
FIG. 6 is a sample representative non-spreadsheet-like applet interfacing with the Calculation Engine in a web browser environment for values from an underlying compiled module representative of a body of spreadsheet data to provide calculation and data transformation features of the represented spreadsheet.
Figure 7:
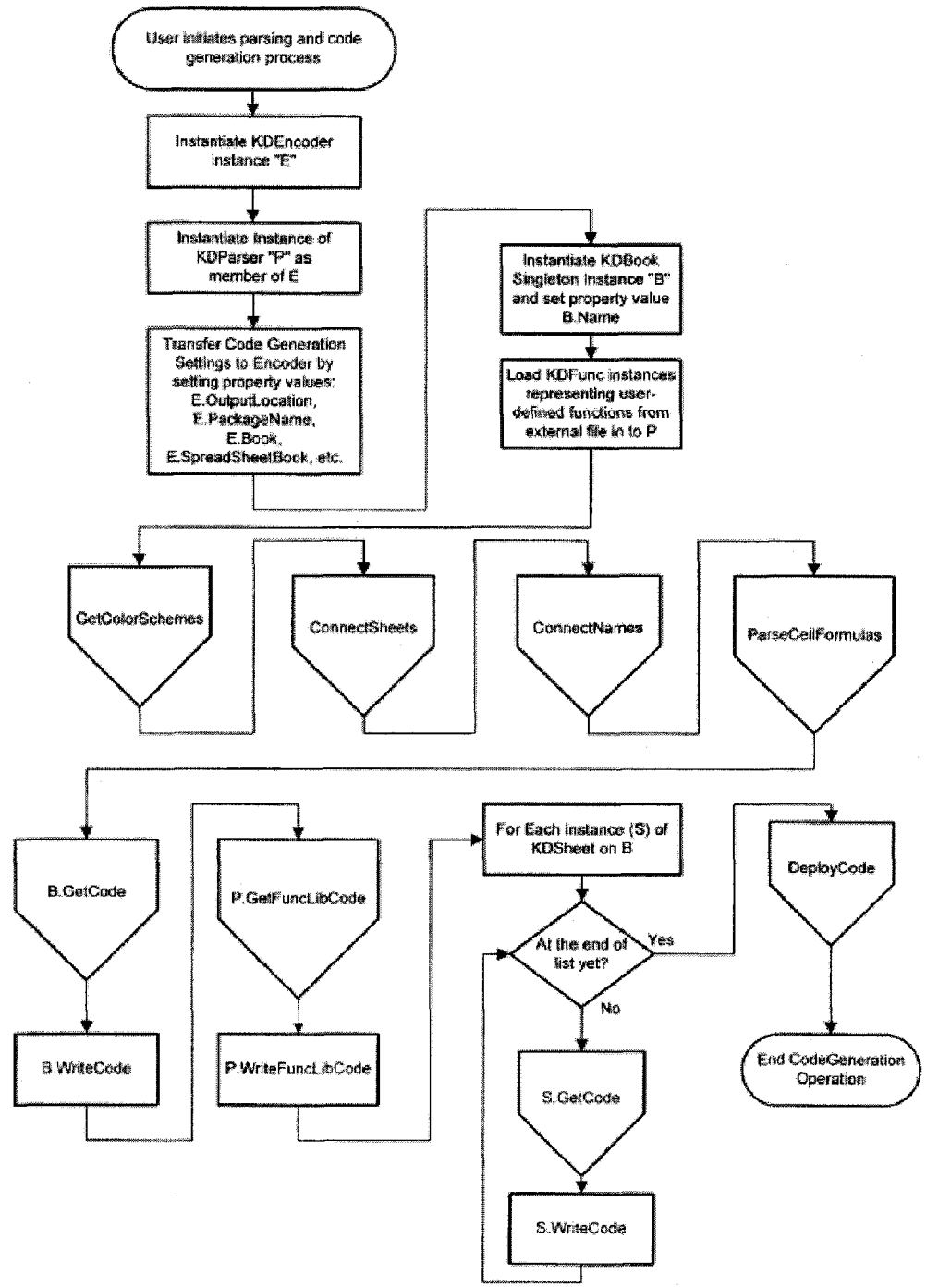
FIG. 7 is a Flow Chart depicting overview of Code Generation Operation.
Figure 8:
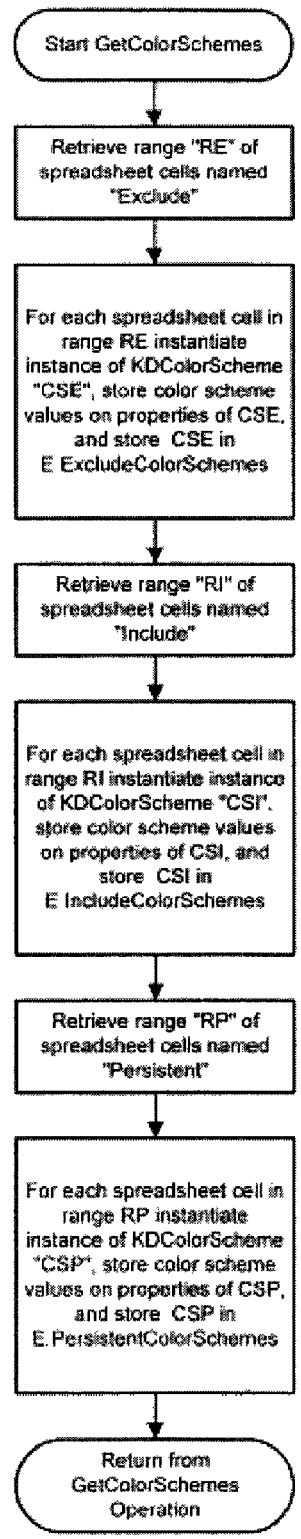
FIG. 8 is a Flow Chart depicting GetColorSchemes sub-operation of Code Generation Operation.
Figure 9:
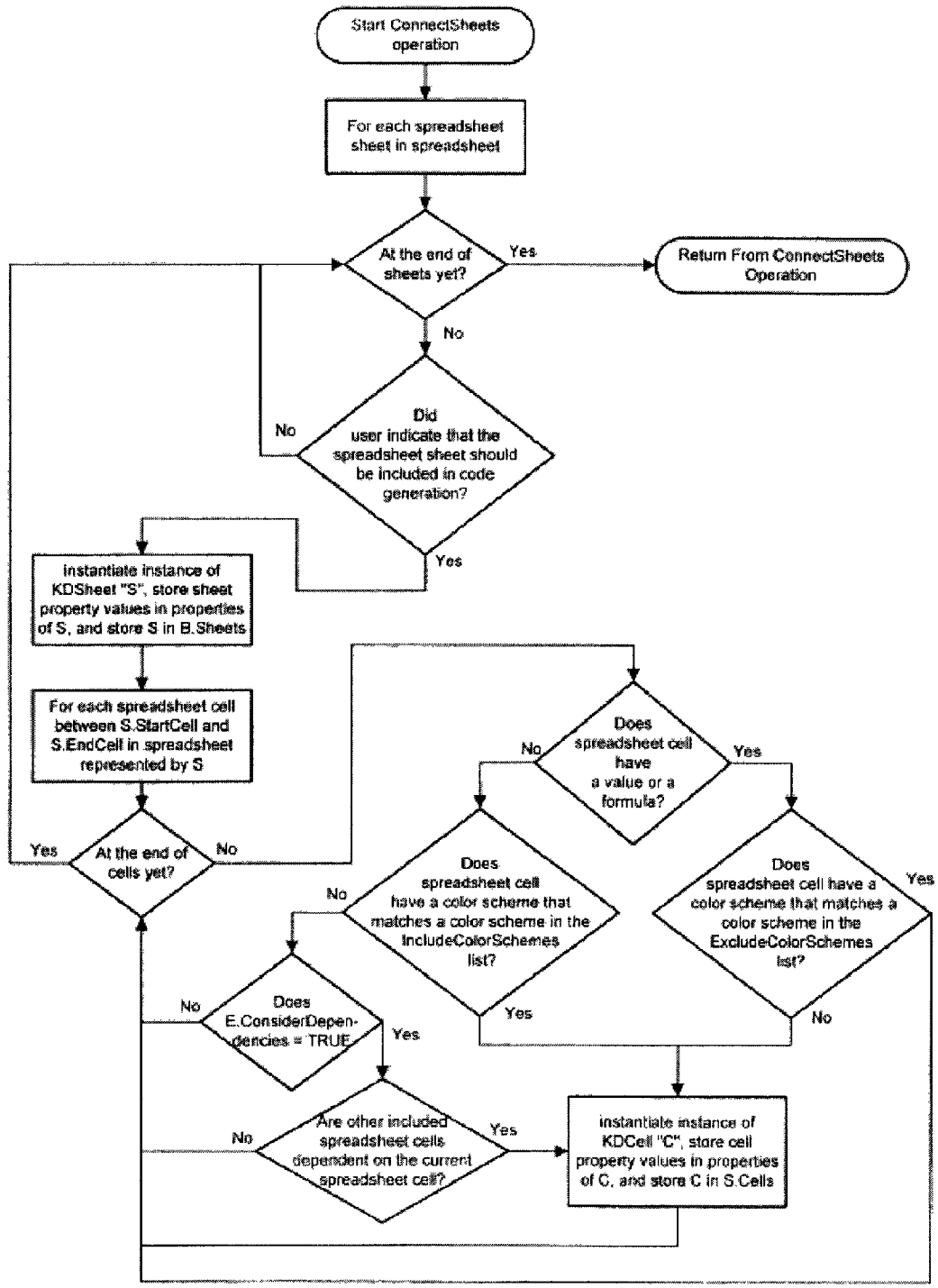
FIG. 9 is a Flow Chart depicting ConnectSheets sub-operation of Code Generation Operation.
Figure 10:
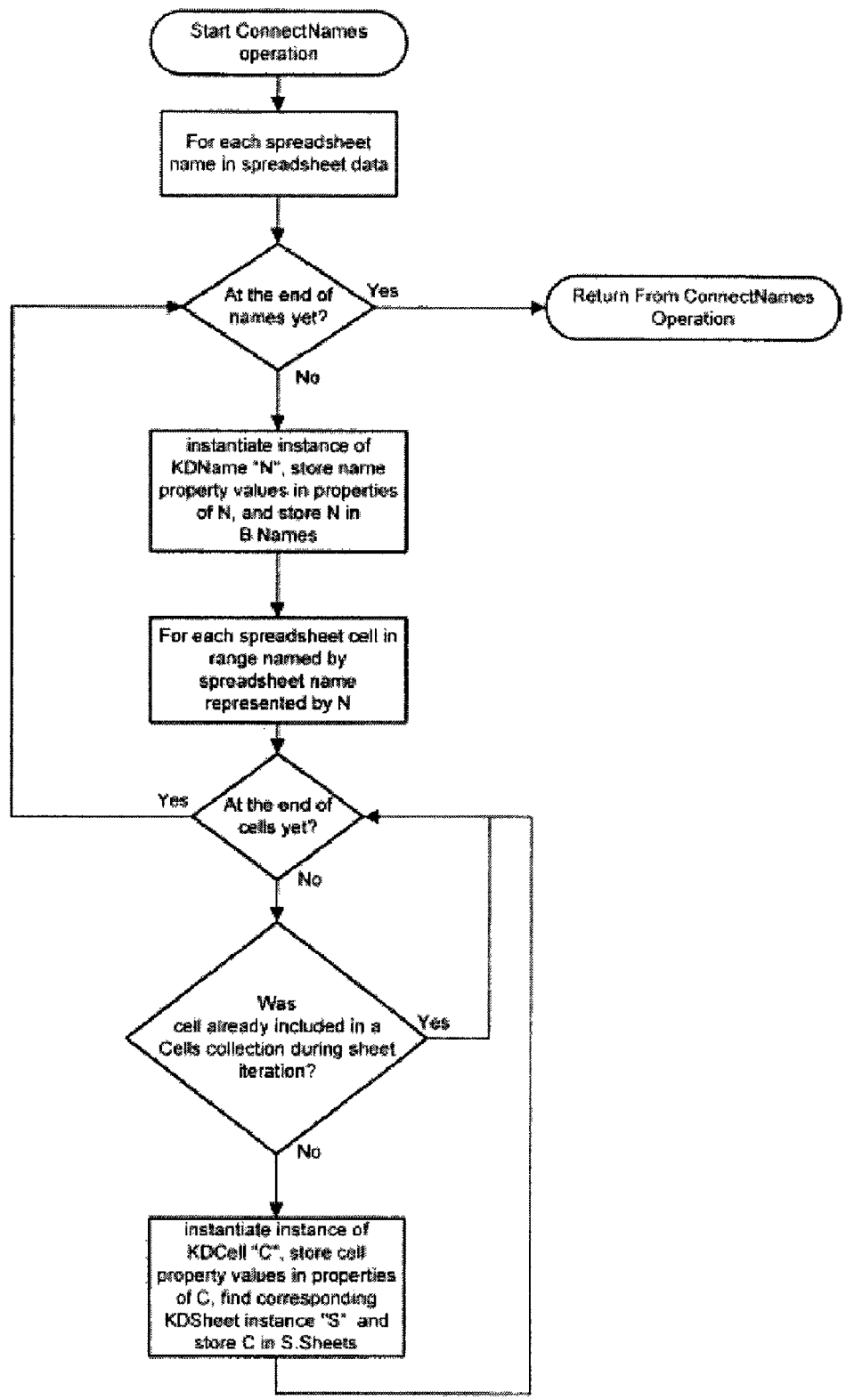
FIG. 10 is a Flow Chart depicting ConnectNames sub-operation of Code Generation Operation.
Figure 11A:
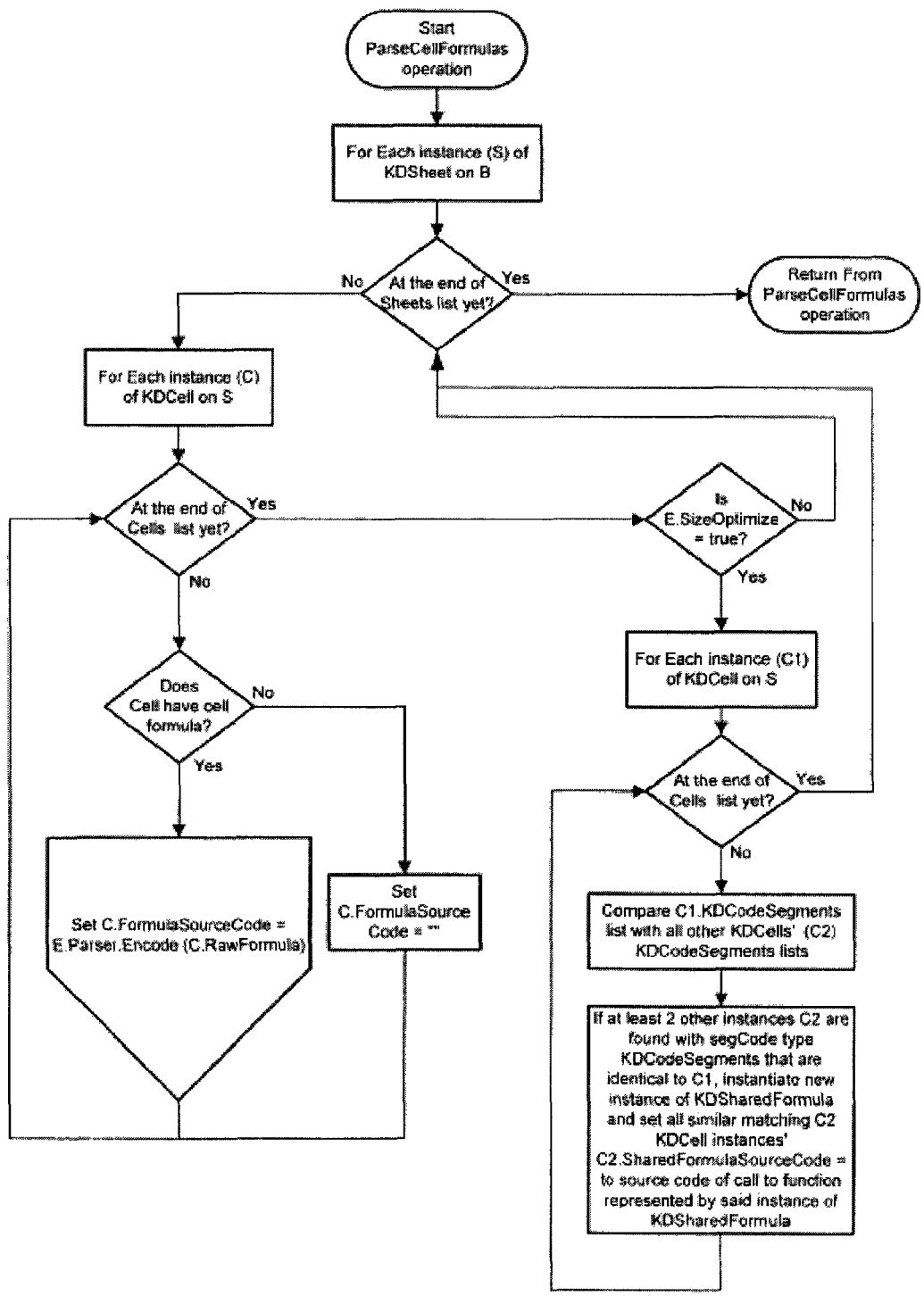
FIGS. 11a-11e are Flow Charts depicting ParseCellFormulas sub-operation of Code Generation Operation.
Figure 11B:
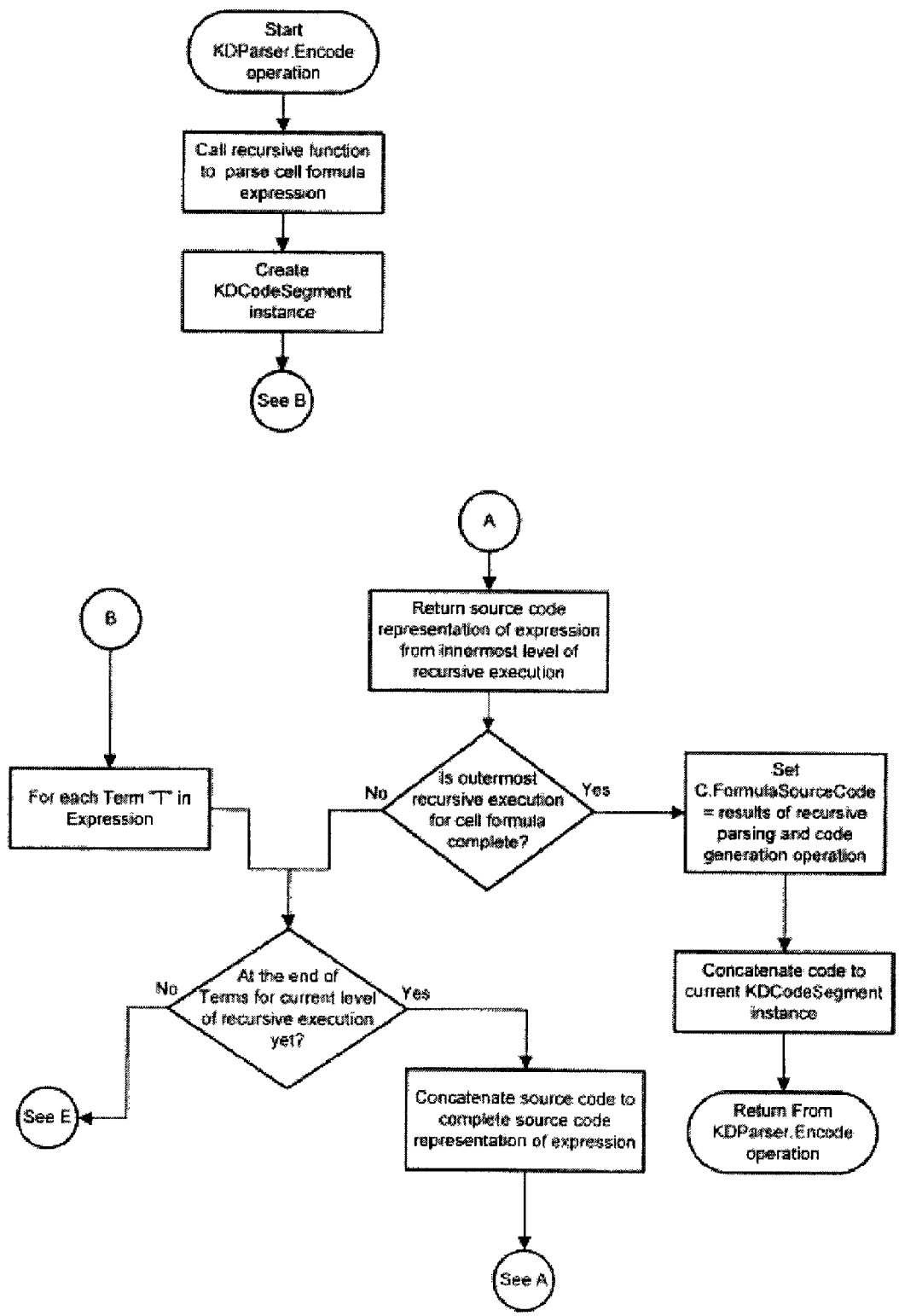
Figure 11C:
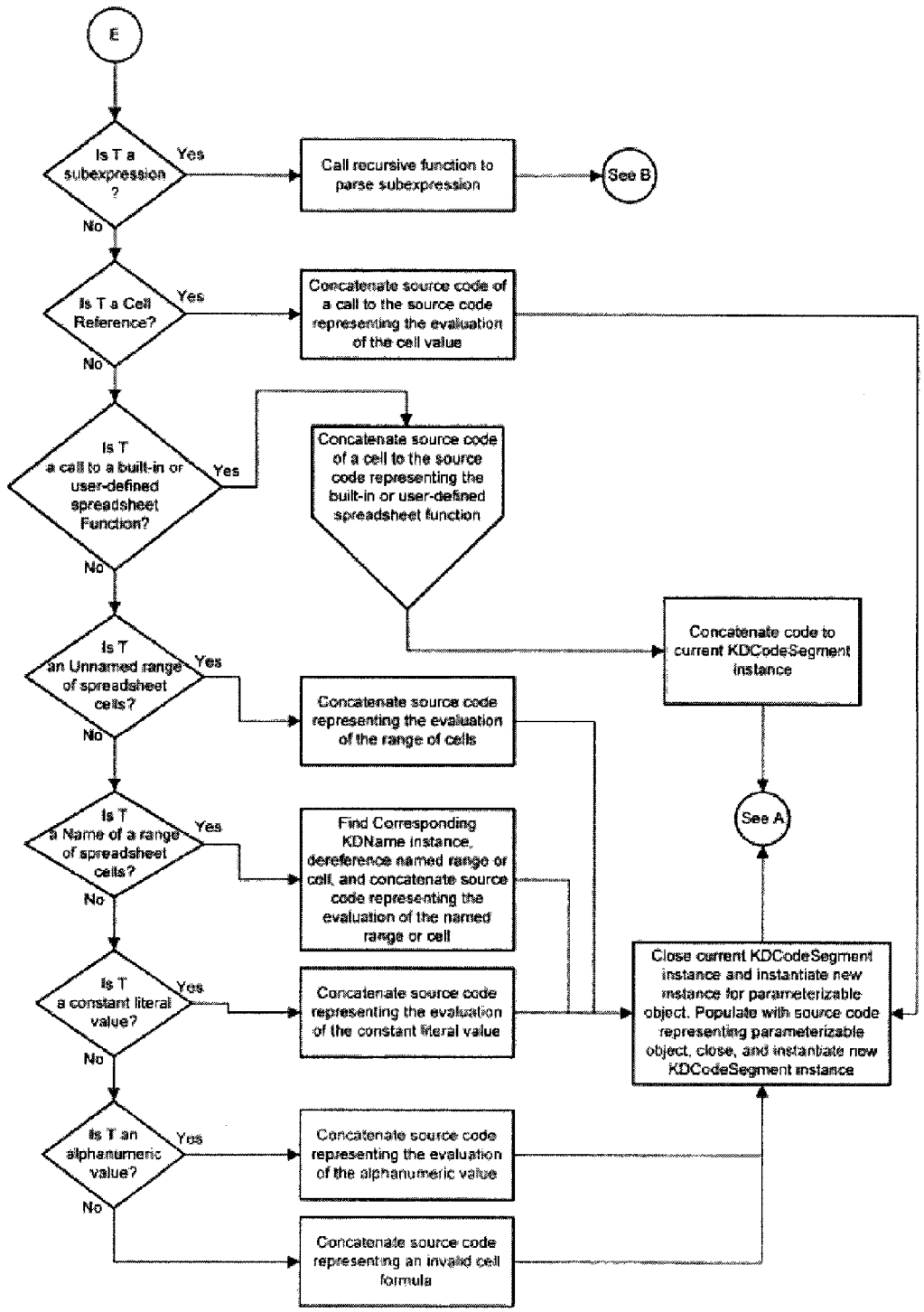
Figure 11D:
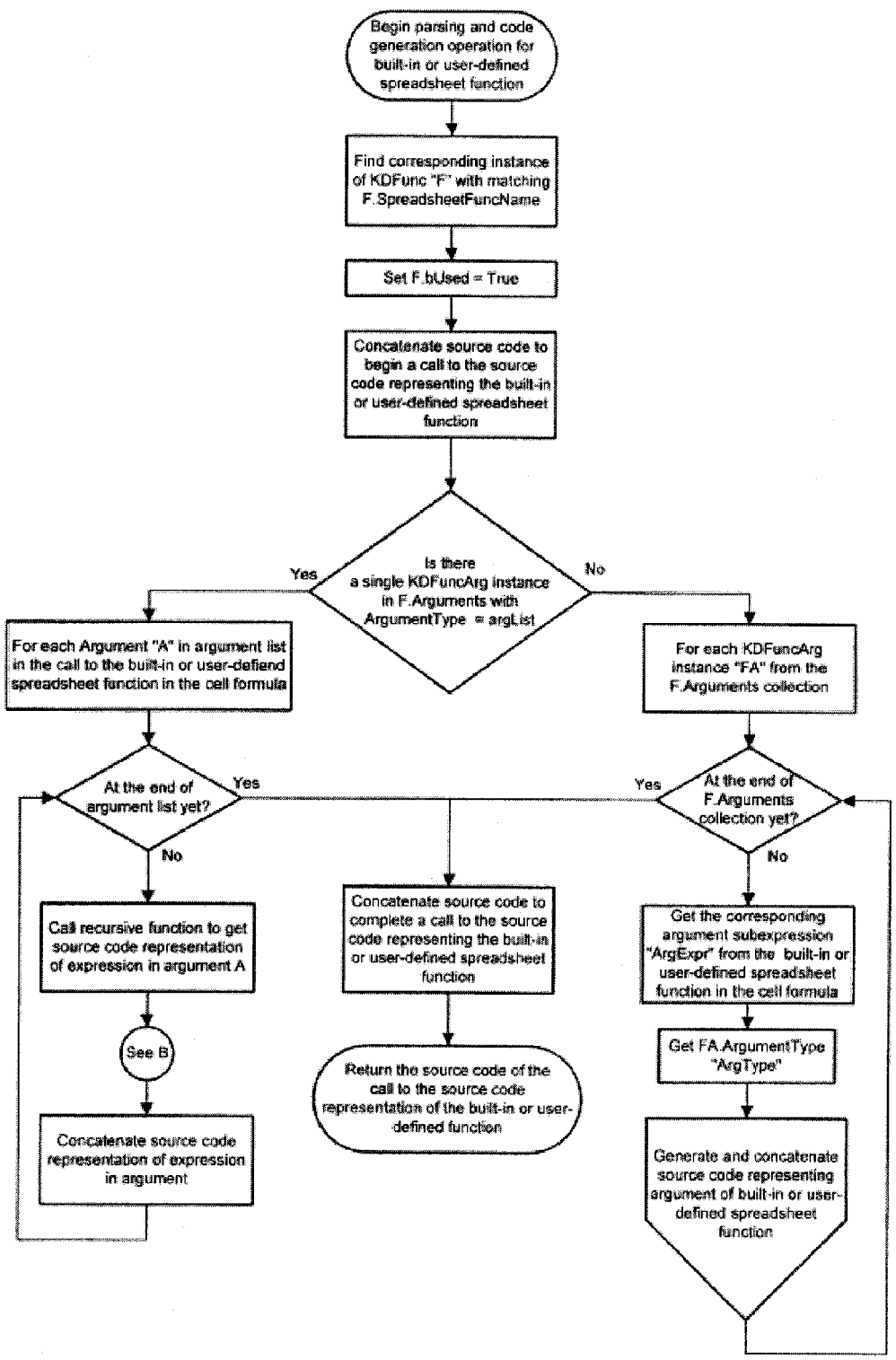
Figure 11E:
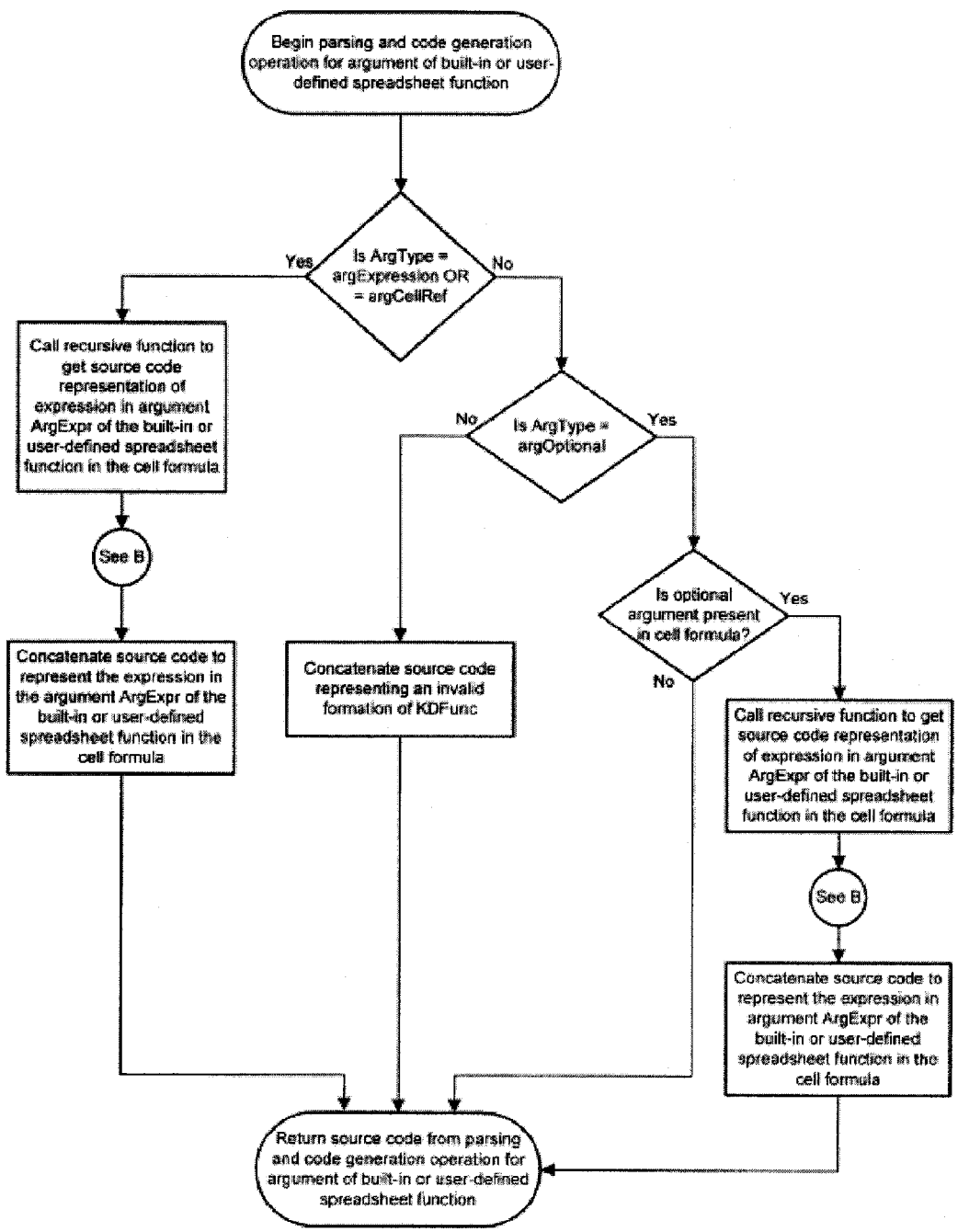
Figure 12:
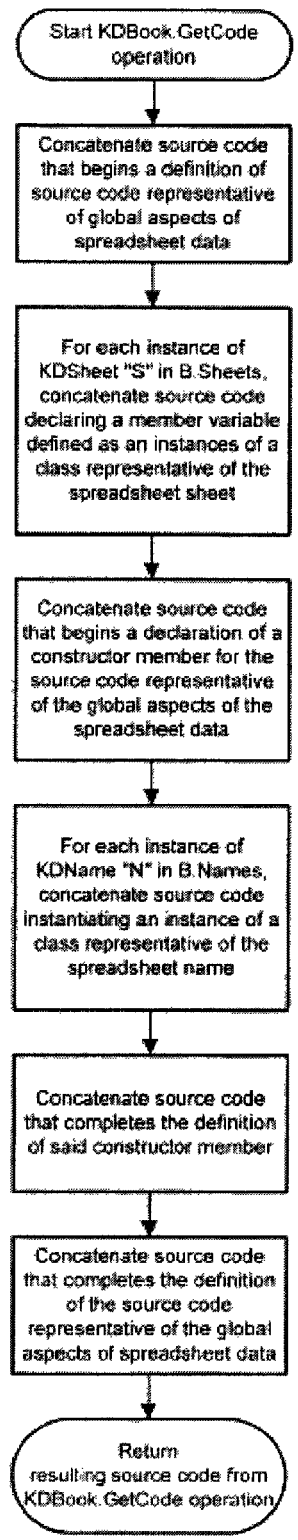
FIG. 12 is a Flow Chart depicting KDBook.GetCode sub-operation of Code Generation Operation.
Figure 13:
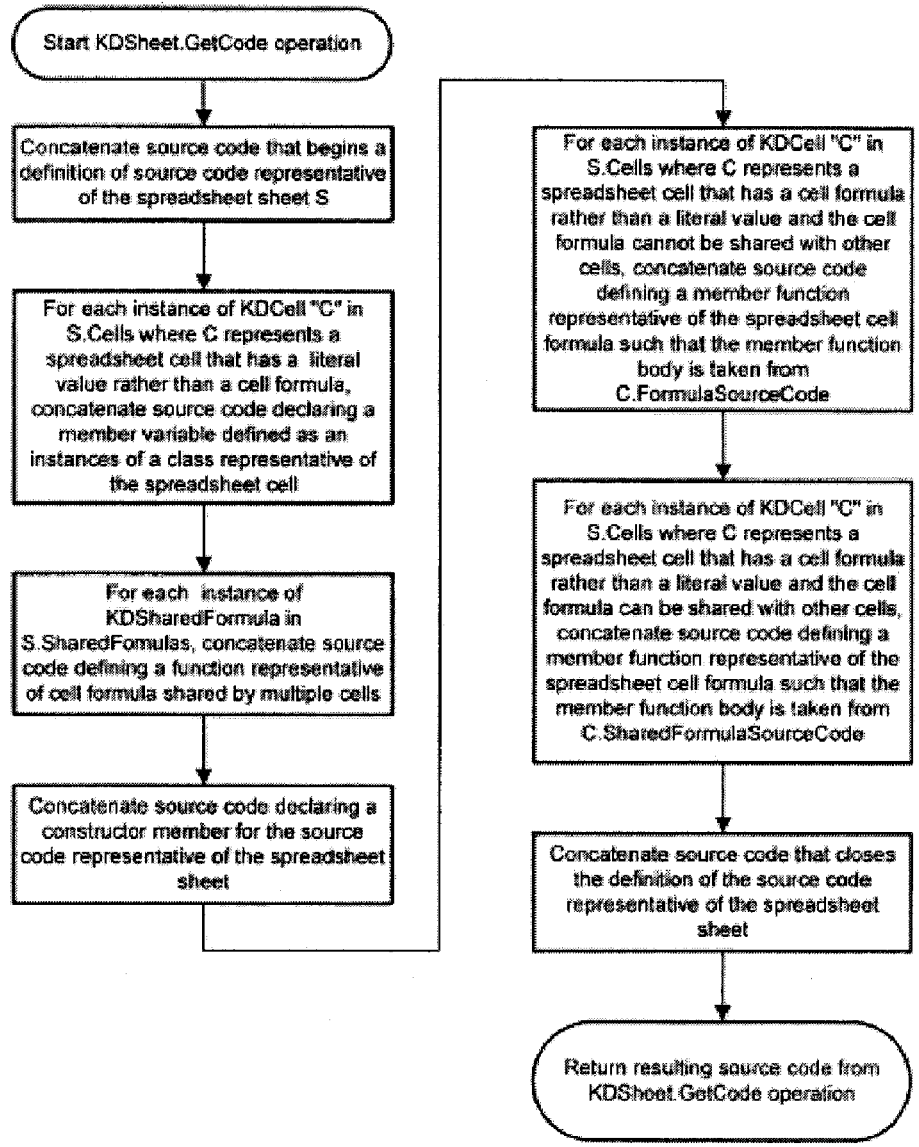
FIG. 13 is a Flow Chart depicting KDSheet.GetCode sub-operation of Code Generation Operation.
Figure 14:
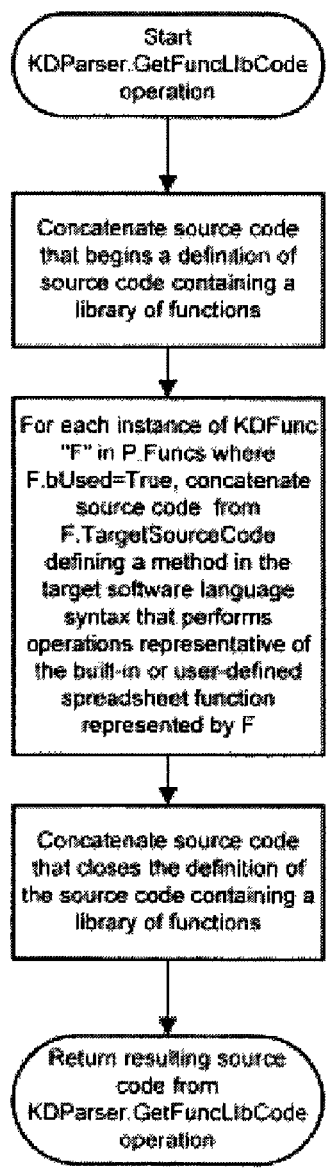
FIG. 14 is a Flow Chart depicting GetFuncLibCode sub-operation of Code Generation Operation.
Figure 15:
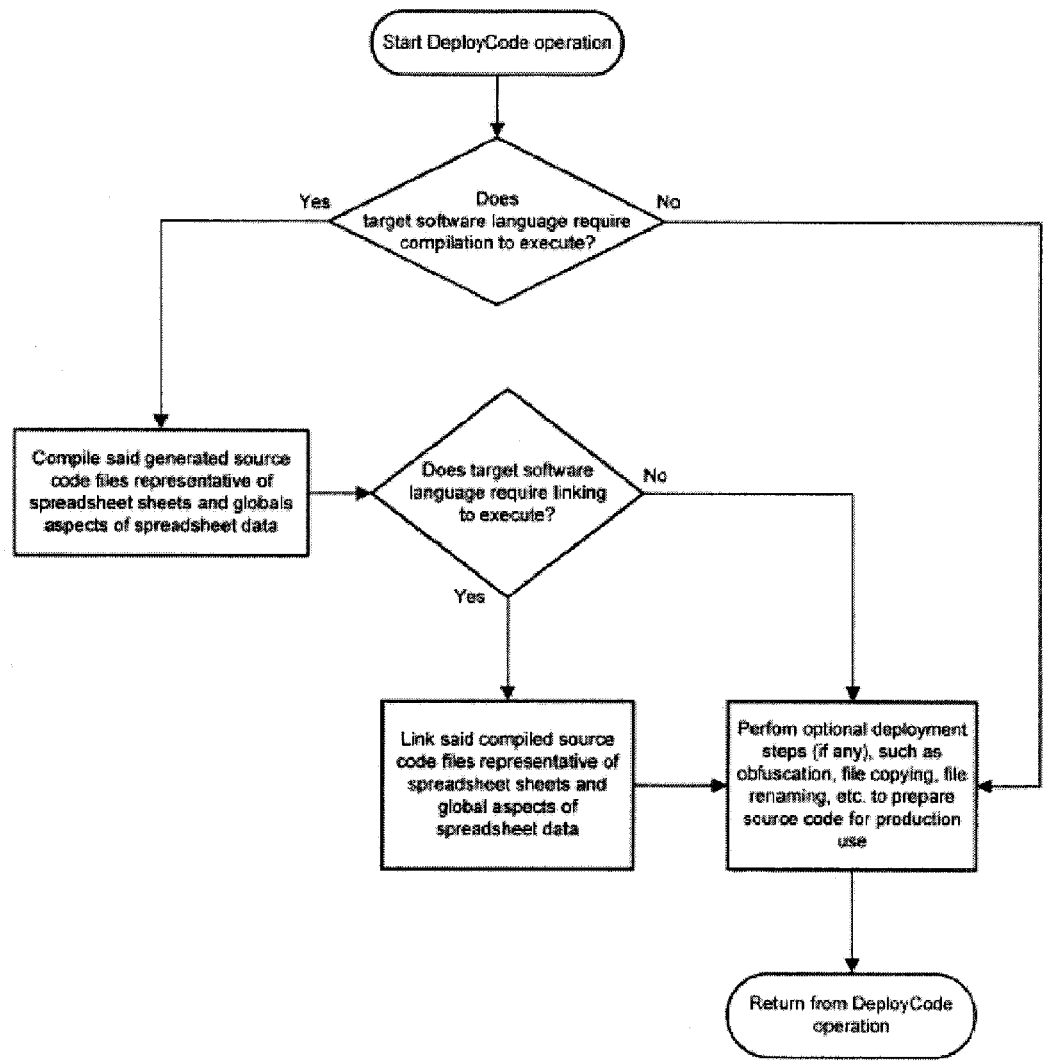
FIG. 15 is a Flow Chart depicting DeployCode sub-operation of Code Generation Operation.
Figure 16:
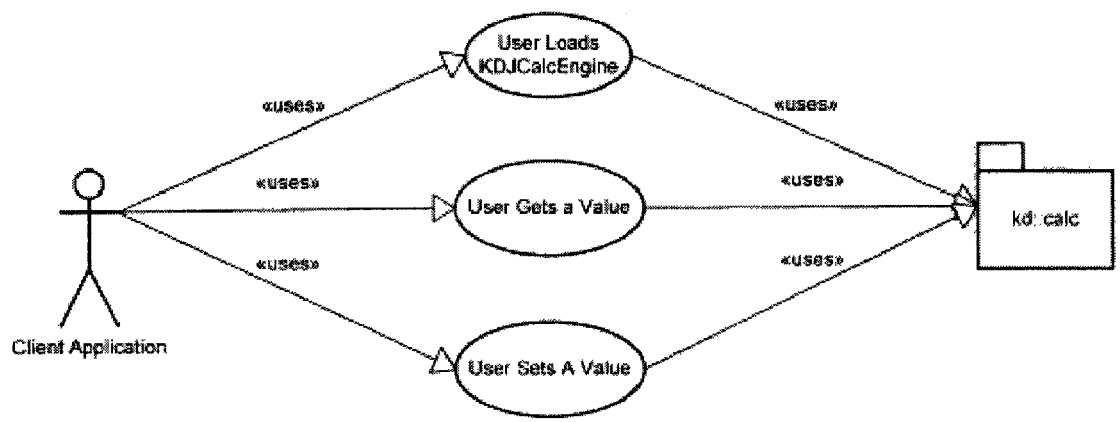
FIG. 16 illustrates Use Case diagram depicting the basic high-level use cases for the Calculation Engine.
Figure 17:
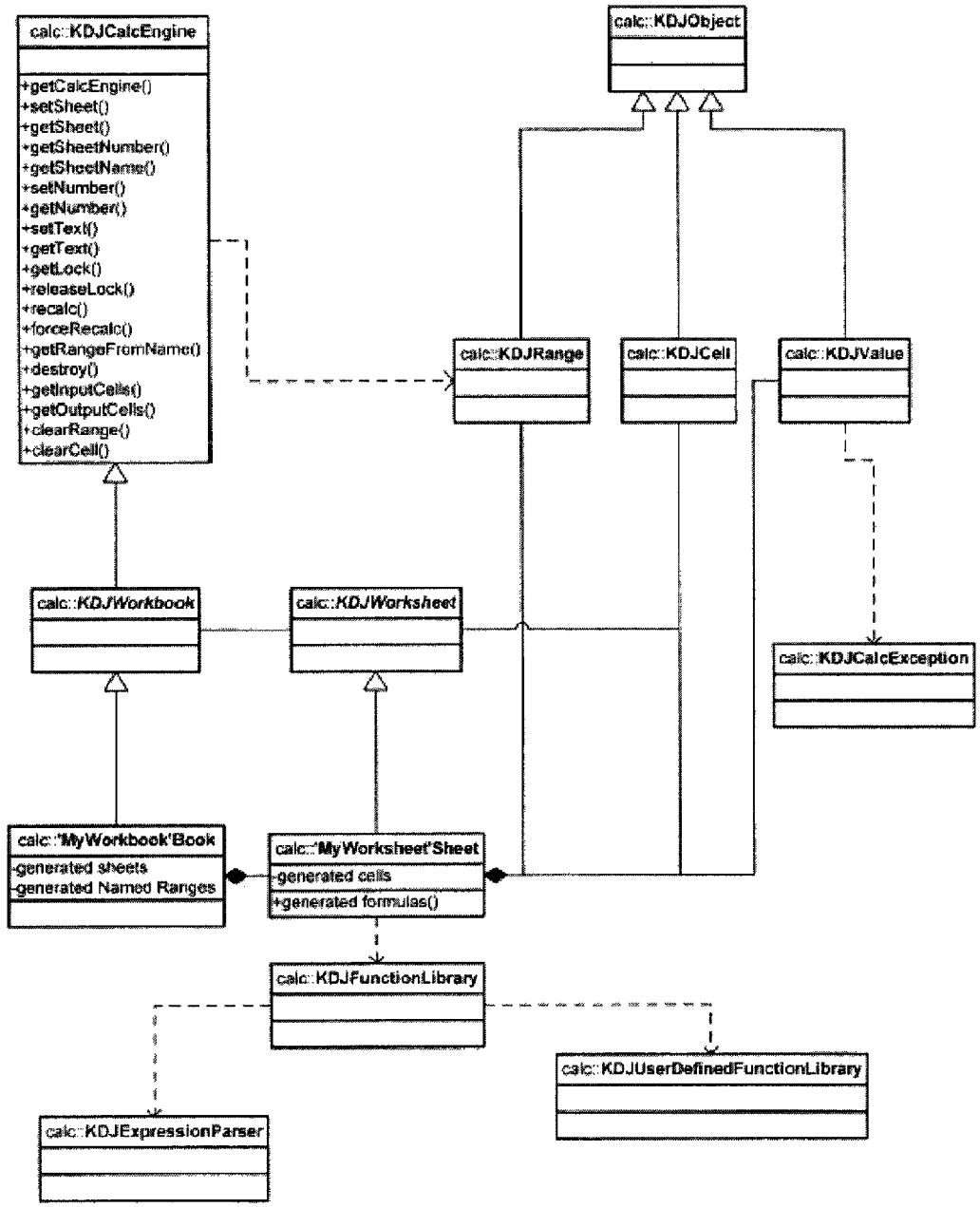
FIG. 17 is a UML Class diagram depicting basic classes used within the Calculation Engine. Some details, such as the public application programming interface (API) methods, are set forth with reference to the data structures used in the calculation engine.
Figure 18:
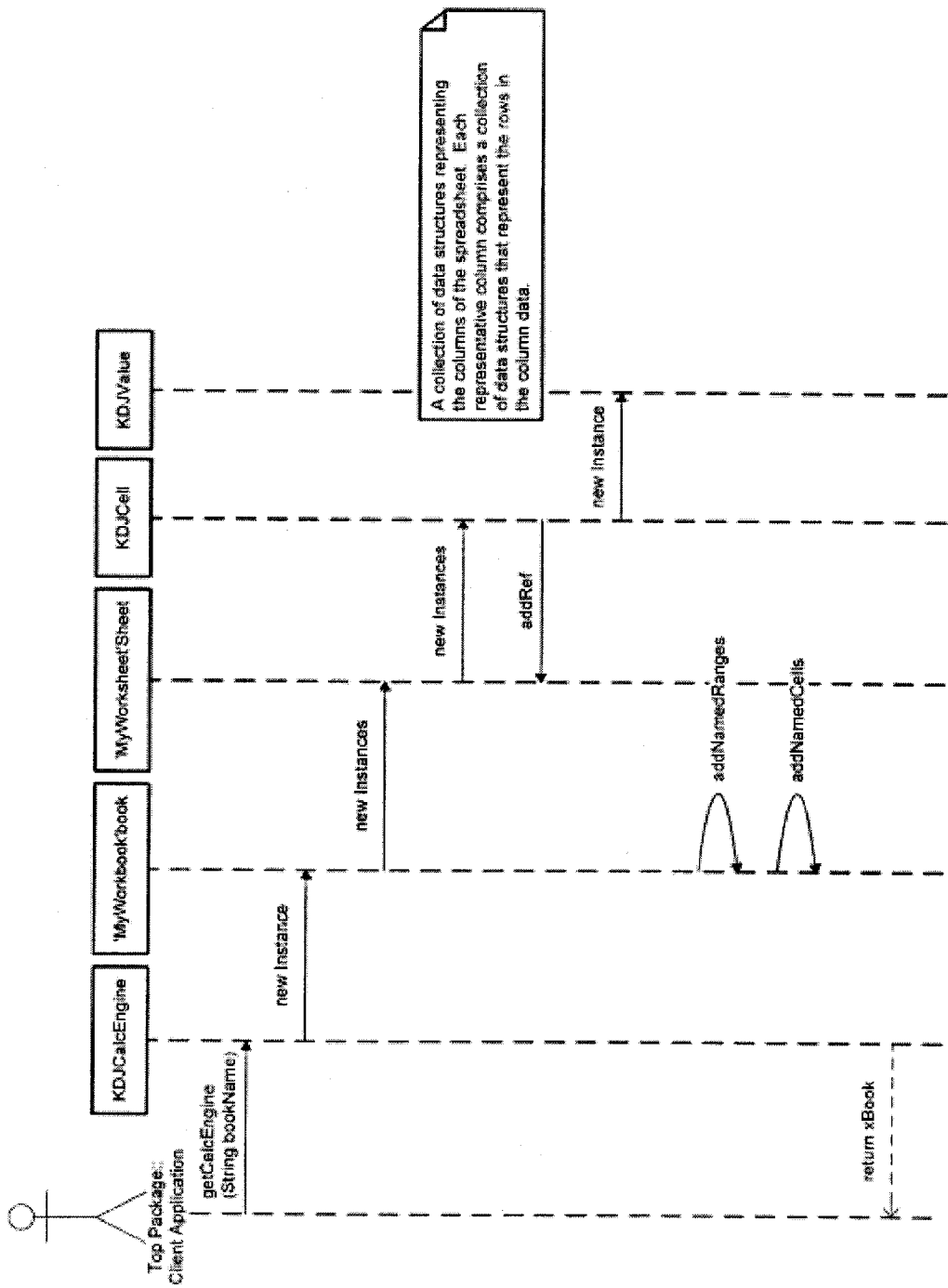
FIG. 18: In accordance with a preferred embodiment, a UML Sequence Diagram depicting basic operations and classes involved with loading an instance of the Calculation Engine.
Figure 19:
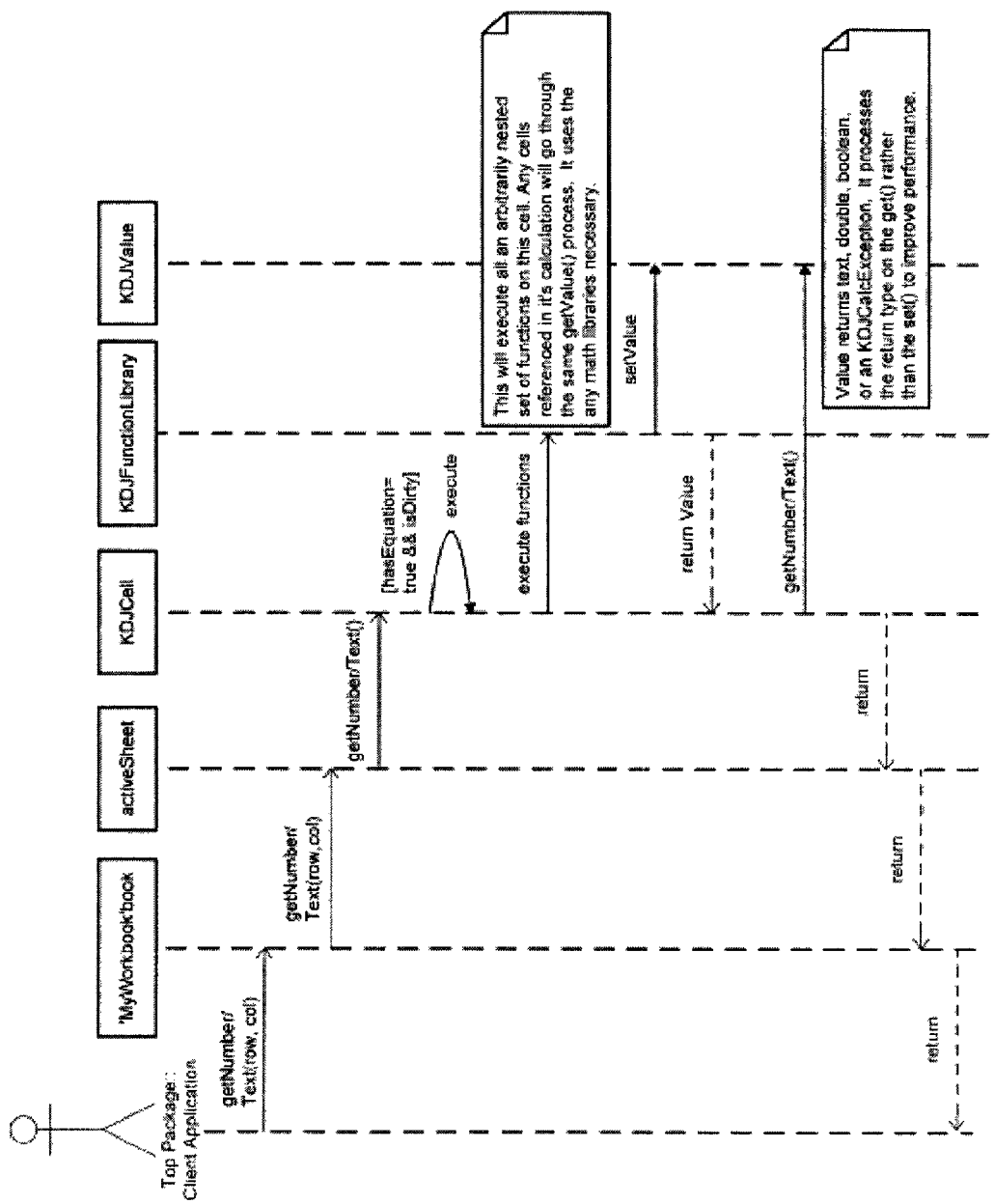
FIG. 19 is a UML Sequence Diagram depicting basic operations and classes involved with getting a value within the Calculation Engine.
Figure 20:
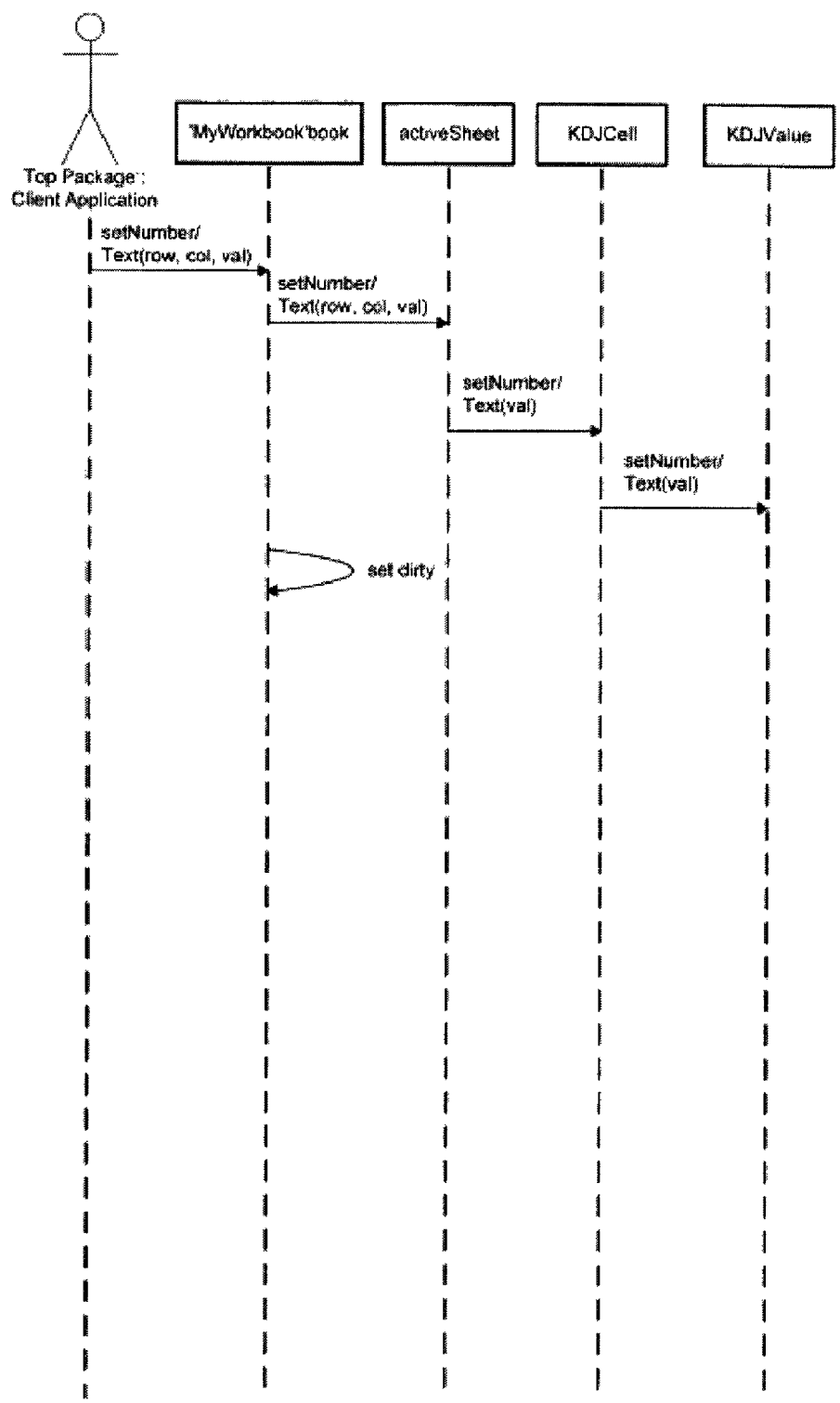
FIG. 20 is a UML Sequence Diagram depicting basic operations and classes involved with setting a value within the Calculation Engine.

With reference to the figures and particularly FIG. 1, a block diagram of the representative computer hardware is shown illustrating a computer system implementing a source code generator with methods employing a process and computer-readable medium containing instructions for controlling the computer system, which comprises a processor or CPU 100 receiving input from a keyed input device 102 or pointing device 104. A display device 106 and printing device 108 are provided for output and volatile storage 110 and non-volatile storage 112 may include computer-readable media and random access memory and the like. As described further below, a spreadsheet application 116 is employed with a plurality of sheets from which a data structure including calculation files are used for corresponding spreadsheet data. A data acquisition interface is used for receiving the spreadsheet data, which is transferable to the calculation files. A parser and source code generator 118 is used for extracting information from the data structure. An information processor facilitated the use of CPU 100 for performing a data transformation of extracted information stored in said data structure through said programming interface to conform to the grammar and syntax of a target software development language. A calculation engine 120 is provided, which has the following benefits:

(a) allowing spreadsheet applications to be relied upon to verify well-formedness of cell formulas;

(b) reducing distribution size by eliminating the overhead of a spreadsheet application or spreadsheet component;

(c) reducing distribution size by eliminating the overhead of User Interface features and run-time cell formula interpretation features;

(d) allowing the generated code to be executed on any platform which supports a target software development language;

(e) improving the performance of the calculations and data transformation features because they are embodied in compiled code rather than being interpreted at runtime;

(f) improving the performance of the calculations and data transformation features because optimizing compilers can optimize for a target platform;

Within the field of object orientation, the concepts of encapsulation, polymorphism, and inheritance are well known. A Class is an embodiment of characteristics and behaviors. An instance of a Class is an object that exhibits the characteristics and behaviors of the Class. There are many well-known and widely available references describing object-oriented principles in great detail.

Within the field of computer applications, spreadsheet concepts are well known. In a typical background art spreadsheet application, a body of spreadsheet data comprises a singleton Workbook comprising a plurality of Worksheets. Worksheets comprise a plurality of Cells that can contain literal data values or formulas that are dependent on other Cells. Individual Cells as well as Ranges of Cells can be Named and can be referred to and accessed by Name. There are many well-known and widely available references describing spreadsheet principles and specific spreadsheet applications and components in great detail.

The disclosed invention comprises several data structures that represent the various entities of a spreadsheet. In a preferred embodiment, the data structures are object-oriented software classes that embody characteristics and behaviors of said spreadsheet entities. The Data Structures may be representative of spreadsheet entities, which may be instantiated as Extensible Markup Language ("XML") data representative of spreadsheet entities. Some of these Data Structures are considered at code-generation time and some are considered at runtime. For the purposes of specification, it is useful to define said data structures:

In a preferred embodiment, the data structures of the Parser and Code Generator comprise the following object oriented software classes: KDBook, KDSheet, KDCell, KDName, KDFunc, KDFuncArg, KDColorScheme, KDEncoder, KDParser, KDCodeSegment, and KDSharedFormula.

In background art spreadsheet-applications and components, the global data aspects of a body of spreadsheet data are commonly referred to as a 'workbook' or a 'book'. KDBook is a software Data Structure that represents the global data aspects of a body of spreadsheet data. In a preferred embodiment, KDBook is an object-oriented software class. A singleton instance of KDBook is instantiated.

| Field | Description |
| --- | --- |
| Name | The global name of the body of spreadsheet data. The value of the Name field is derived from the filename of the body of spreadsheet data. |
| Sheets | Collection of references to KDSheet instances that represent the sheets in the body spreadsheet data. |
| Names | Collection of references to KDName instances that represent the named cells or ranges of cells defined in the spreadsheet data. |
| Method | |
| GetCode | A function that assembles the source code representative of the global aspects of the body of spreadsheet data. |
| WriteCode | A function that writes the representative source code to a file, the name of which may be specified by the user or derived from the filename of the body of spreadsheet data. |

KDSheet is a software Data Structure that represents the aspects of a single spreadsheet sheet within a body of spreadsheet data. In background art spreadsheet applications and components, these are commonly referred to as 'worksheet' or 'sheet'. In a preferred embodiment, KDSheet is an object-oriented software class. An instance of KDSheet is instantiated for each sheet in the body of spreadsheet data.

| Field | Description |
| --- | --- |
| SheetName | The name of the spreadsheet sheet represented by the KDSheet instance. |
| Index | The one-based index of the spreadsheet sheet represented by the KDSheet instance. |
| Book | A reference to the instance of KDBook that represents the global aspects of the body of spreadsheet data. |
| StartCell | A reference indicating the Top Left cell of the spreadsheet sheet for which code is generated. May be set by the user to limit the range of cells for which code is generated. |
| EndCell | A reference indicating the Bottom Right cell of the spreadsheet sheet for which code is generated. May be set by the user to limit the range of cells for which code is generated. |
| Cells | Collection of KDCell instances that represent the cells in said sheet. |
| SharedFormulas | Collection of references to KDSharedFormula instances that represent the cell formulas of a plurality of spreadsheet cells. |
| Method | |
| GetCode | A function that assembles the source code representative of the data and calculation aspects of the sheet of spreadsheet data represented by the instance of KDSheet. |
| WriteCode | A function that writes the representative source code to a file, the name of which may be specified by the user or derived from the name of the spreadsheet sheet. |

KDCell is a software Data Structure that represents the aspects of a single spreadsheet cell within a spreadsheet sheet. In a preferred embodiment, KDCell is an object-oriented software class. An instance of KDCell is instantiated for each cell on said spreadsheet sheet. The KDCell includes the following members.

| Field | Description |
| --- | --- |
| Sheet | A reference to the instance of KDSheet that represents the aspects of the spreadsheet sheet which contains the spreadsheet cell represented by the current instance of KDCell. |
| Row | The row of the represented spreadsheet cell. |
| Col | The column of the represented spreadsheet cell. |
| RC | The text based identifier of the represented spreadsheet cell's row and column. |
| RawFormula | The text of the raw spreadsheet cell formula in the syntax of the spreadsheet application. |

| Field | |
|---|---|
| HasDependents | An indicator of whether other spreadsheet cells depend on (refer to) the spreadsheet cell represented by the current instance of KDCell. |
| HasDeclaration | An indicator indicating whether a source code declaration should be generated for the spreadsheet cell represented by the current instance of KDCell. |
| HasFormula | An indicator of whether the spreadsheet cell represented by the current instance of KDCell contains a cell formula. |
| Persistent | An indicator of whether the current instance of KDCell should be marked as persistable. |
| ForeColor | An indicator of the foreground color of the spreadsheet cell represented by the current instance of KDCell. |
| BackColor | An indicator of the background color of the spreadsheet cell represented by the current instance of KDCell. |
| FormulaSourceCode | The source code representative formula of the spreadsheet cell. Only populated where the represented spreadsheet cell contains a cell formula rather than a literal data value. |
| CodeSegments | An ordered collection of sub-strings of source code segments representative of the function calls and parameters in a cell formula. |
| SharedFormula | A reference to an instance of SharedFormula (defined below) representative of source code called by source code representative of cell formulas with similar formula structures. Only populated where the represented spreadsheet cell contains a cell formula similar enough to other cell formulas that total source code size can be reduced by having the cells call the shared formula rather than implement the formula individually. |
| SharedFormulaSourceCode | The source code to call a shared formula representative of the cell formula. Only populated where the represented spreadsheet cell contains a cell formula rather than a literal data value. |
| Method | |
| GetCode | A function that assembles the source code representative of the calculation aspects of the spreadsheet cell represented by the instance of KDCell. The method is only executed for cells that contain a formula rather than a value. |
| GetDeclaration | A function that assembles the source code representative of the data and identification aspects of the spreadsheet cell represented by the instance of KDCell. |

KDName is a software Data Structure that represents the aspects of a named range of spreadsheet cells within a spreadsheet sheet. In a preferred embodiment, KDName is an object-oriented software class. An instance of KDName is instantiated for each named range of spreadsheet cells within said body of spreadsheet data.

| Field | |
|---|---|
| Description | |
| Name | The text name of the named spreadsheet range represented by the KDName instance. |
| Cell | A reference the KDCell instance representing the single spreadsheet cell named by the spreadsheet name represented by the current instance of KDName. Only populated for spreadsheet names that name a single spreadsheet cell. |
| TLCell | A reference to the KDCell instance representing the Top Left spreadsheet cell of the range of spreadsheet cells named by the spreadsheet name represented by the current instance of KDName. For spreadsheet names that represent a single spreadsheet cell, the KDName.TLCell property is equal to the KDName.Cell property. |
| BRCell | A reference to the KDCell instance representing the Bottom Right spreadsheet cell of the range of spreadsheet cells named by the spreadsheet name represented by the current instance of KDName. For spreadsheet names that represent a single spreadsheet cell, the KDName.BRCell property is equal to the KDName.Cell property. |
| RangeRC | The text, in the syntax of the spreadsheet application, that specifies the range of spreadsheet cells named by the spreadsheet name. |
| RefersTo | An indicator of whether the represented spreadsheet name refers to a single spreadsheet cell or a range of spreadsheet cells. One of rtCell, rtVerticalVector, rtHorizontalVector, rtMatrix, rtCellList. |
| Method | |
| <<none>> | In a preferred embodiment, KDName has no member methods. |

KDFunc is a software Data Structure that represents the aspects of built-in or user-defined spreadsheet functions that can be used in spreadsheet cell formulas. In a preferred embodiment, KDFunc is an object-oriented software class. An instance of KDFunc is instantiated for each supported spreadsheet function. The use of KDFunc allows the present invention to be easily extended to support additional built-in spreadsheet functions and unanticipated user-defined functions by simply adding more instances of KDFunc and KDFuncArg (described below). KDFunc instances representative of built-in spreadsheet functions are included in the invention. KDFunc instances representative of user-defined functions can be dynamically included from an external data source.

| Field | Description |
|---|---|
| SpreadsheetFuncName | The name of the supported function specified in the syntax of the spreadsheet application. |
| TargetCodeFuncName | The name of the supported function specified in the syntax of the target software development language. |
| TargetSourceCode | The source code implementation of the supported built-in or user-defined spreadsheet function specified in the syntax of the target software development language. |
| bUserDefined | A Boolean indicator indicating whether the Function is used is user-defined. For built-in spreadsheet functions, the value of this property is 'False'. For user-defined functions, it is 'True'. |

-continued

| Field | Description |
| --- | --- |
| bUsed | A Boolean indicator indicating whether the Function is used in the spreadsheet and therefore requires that the implementation held in TargetSourceCode be included in the generated source code. The value of bUsed is initially 'False' but is changed to 'True' if the function is encountered in a spreadsheet cell formula during parsing. |
| Arguments | An ordered Collection of KDFuncArg instances that represent the arguments of the represented built-in or user-defined spreadsheet function. |

KDFuncArg is a software Data Structure that represents the aspects of arguments of built-in or user-defined spreadsheet functions that can be used in spreadsheet cell formulas. In a preferred embodiment, KDFuncArg is an object-oriented software class. An instance of KDFuncArg is instantiated for each argument accepted by each supported spreadsheet function. The use of KDFuncArg allows the present invention to easily support the representation of built-in or user-defined spreadsheet functions that take any number of arguments. Some built-in or user-defined spreadsheet functions take no arguments, some take a fixed number of arguments, some have optional arguments, and some can take a variable-length list of arguments.

| Field | Description |
| --- | --- |
| Func | A reference to the instance of KDFunc that represents the aspects of the built-in or user-defined spreadsheet function, an argument of which is represented by the current instance of KDFuncArg. |
| N | The sequence ordinal of the argument represented by the current instance of KDFuncArg. For the first argument, the value of this property is '1'; for the second argument, the value of this property is '2', and so on. |
| ArgumentType | An indicator of the type of argument of the current argument of the supported spreadsheet function. One of: argCellRef, argExpression, argOptional, or argList. argCellRef indicates that the Nth argument must be a reference to a spreadsheet cell or a name of a single spreadsheet cell. argExpression indicates that the Nth argument can be any expression that has a value, including a static value, a reference to another cell, or a call to another built-in or user-defined spreadsheet function. argOptional indicates that there may or may not be an Nth argument in the built-in or user-defined spreadsheet function. If an instance of KDFuncArg is defined with ArgumentType = argOptional then every instance of KDFuncArg that follows said instance (if any) must have its ArgumentType property equal to argOptional. argList indicates that the built-in or user-defined spreadsheet function takes a variable-length list of arguments. If the function takes a variable length list of arguments, then one and only one instance of KDFuncArg should be instantiated for the built-in or user-defined spreadsheet function, and its ArgumentType field must be equal to argList. |

KDCodeSegment is a software Data Structure that represents the aspects of a segment of code in a cell formula. In a preferred embodiment, KDCodeSegment is an object-oriented software class. An instance of KDCodeSegment is instantiated for each contiguous code segment or parameterizable reference in a cell formula. The use of KDCodeSegment allows the output of present invention to be optimized by identifying spreadsheet cells with cell formulas similar enough that total generated source code size can be reduced by having multiple cells call the shared formula rather than implement the formula individually.

| Field | Description |
| --- | --- |
| Code | The source code characters in the KDCodeSegment. |
| Type | An indicator of the type of the KDCodeSegment. One of: segCode, segName, segRCRangeRef, or segRCCellRef. segCode indicates that the segment is source code. segName indicates that the segment represents a reference to a named cell or range. segRCRangeRef indicates that the segment represents a reference to a range of cells. segRCCellRef indicates that the segment represents a reference to a cell. |

KDSharedFormula is a software Data Structure that represents the aspects of a cell formula formation that is common to multiple cells. In a preferred embodiment, KDSharedFormula is an object-oriented software class. An instance of KDSharedFormula is instantiated where at least two cells are similar enough that total generated source code size can be reduced by having multiple cells call a shared formula rather than implement the formula individually.

| Field | Description |
| --- | --- |
| SharedFormulaName | The name of the source code function represented by SharedFormula. |
| SharedFormulaDefinition | The source code definition of the function represented by SharedFormula. |

KDColorScheme is a software Data Structure that represents the aspects of a particular combination of colors of spreadsheet cell features. In a preferred embodiment, KDColorScheme is an object-oriented software class. An instance of KDColorScheme is instantiated for each color scheme defined by the user in said body of spreadsheet data. The KDColorScheme allows the user to indicate which spreadsheet cells should be included in code generation, excluded from code generation, and marked as persistent, by specifying the foreground and background colors of the spreadsheet cell.

| Field | Description |
| --- | --- |
| BackColor | Identifier of the background color of the spreadsheet cell. |
| ForeColor | Identifier of the foreground (font) color of the spreadsheet cell. |

KDEncoder is a software Data Structure that represents the aspects of a parser and code generator that generates software source code representative of a body of spreadsheet data. In a preferred embodiment, KDEncoder is an object-oriented software class. A singleton instance of KDEncoder is instantiated to generate said software source code.

| Field | Description |
|---|---|
| SpreadsheetBook | A reference to a spreadsheet application singleton object that comprises the global aspects of the body of spreadsheet data. |
| Book | A reference to the singleton instance of KDBook instantiated to represent the global aspects of the body of spreadsheet data. |
| OutputLocation | The user-specified file system path to the folder or directory where generated source code files are to be deposited. |
| PackageName | A preferred embodiment of the present invention generates source code that conforms to the Java ®. software language by Sun Microsystems. The PackageName field directs that said generated software source code contain the user-specified PackageName field value as a Package descriptor consistent with the Package construct of the Java ® software language by Sun Microsystems. |
| ConsiderDependencies | An indicator of whether said source code generation process should generate source code for all spreadsheet cells that have dependencies even if they are otherwise outside of the inclusion conditions. |
| SpreadsheetBook | A reference to a spreadsheet application singleton object that comprises the global aspects of the body of spreadsheet data. |
| Book | A reference to the singleton instance of KDBook instantiated to represent the global aspects of the body of spreadsheet data. |
| OutputLocation | The user-specified file system path to the folder or directory where generated source code files are to be deposited. |
| PackageName | A preferred embodiment of the present invention generates source code that conforms to the Java software language. The PackageName field directs that said generated software source code contain the user-specified PackageName field value as a Package descriptor consistent with the Package construct of the Java software language. |
| ConsiderDependencies | An indicator of whether said source code generation process should generate source code for all spreadsheet cells that have dependencies even if they are otherwise outside of the inclusion conditions. |
| SizeOptimize | An indicator of whether said source code generation process should try to reduce the size of generated code by replacing individual implementations of source code representative of similarly structured cell formulas with calls to shared functions representative of said similarly structured cell formulas. |
| IncludeColorSchemes | Collection of references to KDColorScheme instances that represent all the color schemes of spreadsheet cells for which representative source code should be generated, even if the spreadsheet cells are otherwise outside of the inclusion conditions. |
| ExcludeColorSchemes | Collection of references to KDColorScheme instances that represent all the color schemes of spreadsheet cells for which representative source code should not be generated, even if the spreadsheet cells are otherwise in most of the inclusion conditions. |
| PersistentColorSchemes | Collection of references to KDColorScheme instances that represent all the color schemes of spreadsheet cells for which representative source code will be generated and for which said representative source code will indicate that the cells should be marked as persistent. |
| Parser | A reference a KDParser instance that is used to generate source code representative of individual spreadsheet cell formulas. |

| Method | |
|---|---|
| ConnectBook | A function that instantiates an instance of KDBook and connects it via a property reference to the spreadsheet application singleton object that comprises the global aspects of the body of spreadsheet data. |
| ConnectSheet | A function that is called for each spreadsheet sheet in the body of spreadsheet data to instantiate an instance of KDSheet and connect it via a property reference to the represented spreadsheet sheet. The properties of the KDSheet instances are also populated with relevant fields that describe the spreadsheet sheet, and with a reference to the singleton instantiated KDBook instance. |
| ConnectNames | A function that is called for each spreadsheet name in the body of spreadsheet data to instantiate an instance of KDName and connect it via a property reference to the represented spreadsheet name. The properties of the KDName instances are also populated with relevant fields that describe the spreadsheet name, and with a reference to the singleton instantiated KDBook instance. |
| GetColorSchemes | A function that searches the body of spreadsheet data for user-defined color schemes that indicate which cells are to be included, excluded, and or marked as persistent in the generated source code. An instance of KDColorScheme is instantiated and stored in the corresponding KDEncoder field for each color scheme found. |
| ParseCellFormulas | A function that iterates through each spreadsheet sheet and each spreadsheet cell within said sheet to generate and store the source code representative of the cell formula for each of said spreadsheet cells. |
| WriteCode | A function that writes the generated source code representative of the body of spreadsheet data to files in the said OutputLocation. |
| DeployCode | A function that further processes said generated source code to prepare it for deployment in a target execution environment. |

KDParser is a software Data Structure that represents aspects of a recursive descent expression parser that parses spreadsheet cell formulas and generates software source code representative of the calculations and data transformations of said spreadsheet cell formulas. In a preferred embodiment, KDParser is an object-oriented software class. A singleton instance of KDParser is instantiated to parse said cell formulas and generate said representative source code. All cell formula parsing functionality is embodied in this class. In a preferred embodiment, KDParser parses a cell formula and generates source code conforming to the grammar and syntax of a software development language, such as the Java® language by Sun Microsystems. Various derivations of KDParser support various target software development languages, such as Visual Basic®, VBScript®, Jscript® and Microsoft Visual Basic® for Applications by Microsoft, Basic, Assembler, C++, C#, Fortran, COBOL and other existing and unanticipated target software development languages.

| Field | Description |
|---|---|
| Funcs | A collection of KDFunc instances that represent the built-in and user-defined spreadsheet functions. |
| Method | |
| Encode | Function that parses a complete spreadsheet cell formula and generates representative source code in a target software development language. Calls GetSubExprSourceCode for subexpressions within cell formula. |
| GetSubExprSourceCode | Recursive method that parses arbitrary-depth nested subexpressions in spreadsheet cell formulas. |
| GetTok | Method that isolates tokens within sub expressions of cell formulas. ParseFunc Method that parses and generates representative source code for built-in and user-defined spreadsheet functions. |
| ParseArgs | Method that parses and generates representative source code for arguments within built-in and user-defined spreadsheet functions. |
| ParseArgList | Method that parses and generates representative source code for arguments within built-in and user-defined spreadsheet functions where said spreadsheet function accepts a variable-length list of arguments. |

In a preferred embodiment, the data structures of the Calculation Engine comprise the following object oriented software classes: IKDJEngine, KDJEngine, KDJObject, KDJWorkbook, 'MyWorkbook'book, KDJWorksheet, 'MyWorksheet' sheet, KDJCell, KDJRange, KDJValue, and KDJExpressionParser, KDJCalcException, KDJFunctionLibrary, and KDJUserDefinedFunctionLibrary.

KDJEngine is a software Data Structure and functions that together represent aspects of a Calculation Engine. KDJEngine implements a public application programming interface (API) that make features of the invention available to calling applications. The methods are directed at loading, getting, and setting values, among other operations. In a preferred embodiment, KDJEngine is an object-oriented software class. A singleton instance of KDJEngine is instantiated at runtime. Note that the list of methods exposed of KDJEngine is exemplary.

| Field | Description |
|---|---|
| <<none>> | In a preferred embodiment, KDJEngine has no fields. |
| Method | |
| getCalcEngine | A method which takes in an identifier of the generated source code and returns an instance of the Calculation Engine to work with |
| forceRecalc | A method which forces the Calculation Engine to mark the KDJWorkbook dirty so that all instantiations representing spreadsheet cells with formulas are recalculated. |

| Field | |
|---|---|
| getActiveSheet | A method which returns an identifier of the active instance of KDJWorksheet (defined below). |
| SetActiveSheet | A method which activates an instance of KDJWorksheet. |
| getSheetName | A method which takes in a numeric identifier and returns the name of the represented worksheet. |
| getSheetNumber | A method which takes in the name of a represented worksheet and returns a numeric identifier of the represented active worksheet. |
| getCellText | A method that takes in a row and column to return the text interpretation of the represented cell's value on the represented active worksheet. |
| setCellText | A method that takes in a row identifier, column identifier, and text value and sets the represented cell's value on the represented active worksheet. |
| getCellNumber | A method that takes in row and column identifiers to return the numeric (double) interpretation of the corresponding represented cell's value on the represented active sheet. |
| setCellNumber | A method that takes in a row identifier, a column identifier, and a numeric (double) value and sets the represented cell's value on the represented active worksheet. |
| getCellLogical | A method that takes in row and column identifiers to return the Boolean (double) interpretation of the corresponding represented cell's value on the represented worksheet. |
| setCellLogical | A method that takes in a row identifier, a column identifier, and a Boolean value and sets the represented cell's value on the represented active worksheet. |
| getRangeFromName | A method that takes in a name identifier and returns a KDJRange instance that represents the cell or cells associated with the name. |
| getInputCells | A method which returns a collection of KDJCell instances which are used for input operations only. These are indexed by A1 notation. |
| getOutputCells | A method which returns a collection of KDJCell instances which are used for output operations only. These are indexed by A1 notation. |
| getPersistentCells | A method which returns a collection of the KDJCell instances which are marked as persistent. These are indexed by A1 notation. |
| getSheetCount | A method which returns the number of represented worksheets in the represented workbook. |
| clearCell | A method that takes in row and column identifiers and clears the value of the represented cell. |
| clearRange | A method which takes in a range identifier and clears the values in the represented cells. |
| hasFormula | A method which takes in row and column identifiers and returns an indicator of whether the represented cell contains a cell formula. |

In a preferred embodiment, KDJObject is an object-oriented software class that has no member data fields or methods, but acts as the root-most class in an inheritance hierarchy. KDJValue, KDJRange, and KDJCell all inherit from KDJObject. Instances of KDJObject are not instantiated directly.

| Field | |
|---|---|
| Description | |
| <<none>> | In a preferred embodiment, KDJObject has no member fields. |
| Method | |
| <<none>> | In a preferred embodiment, KDJObject has no member methods. |

In background art spreadsheet applications and components, the global data aspects of a body of spreadsheet data are commonly referred to as a 'workbook' or a 'book'. In the present invention, KDJWorkbook is a software Data Structure and functions defined in the target software development language that together represent the global, general data and behavior aspects of a body of spreadsheet data at runtime. In a preferred embodiment, KDJWorkbook is an object-oriented software class from which classes representative of specific spreadsheet workbooks are derived. KDJWorkbook inherits from KDJEngine. KDJWorkbook is not instantiated at runtime.

| Field | |
|---|---|
| Description | |
| Sheets | A collection of references to the contained KDJWorksheet instances. |
| ActiveSheet | A reference to the active KDJWorksheet instance. |
| Names | A collection of data structures representing named spreadsheet cells and ranges of spreadsheet cells. |
| dirtyCount | A numeric counter that keeps track of the instance of KDJWorkbook's state. Each KDJCell object has a corresponding dirtyCount. If the count on the KDJCell is not equal to the dirtyCount on the KDJWorkbook, then the formula attached to the KDJCell must be recalculated. The dirtyCount is incremented every time a KDJCell value is set through KDJEngine. |
| Method | |
| addNamedCell | A method which takes in a name and a KDJCell reference and makes an association on the KDJWorkbook that the name refers to the KDJCell instance. |
| addNamedRange | A method which takes in a name and KDJRange reference and makes an association on the book that the name refers to the KDJRange. |
| addSheet | A method that takes in a KDJWorksheet reference, a position, and a name and adds a KDJWorksheet reference to the KDJWorkbook. |
| setRecalc | A method which increments the dirtyCount to indicate that KDJCell instances representing spreadsheet cells with formulas need to be recalculated. |

'MyWorkbook' book is a software Data Structure and functions defined in the target software development language that together represent global data and behavior aspects of a specific body of spreadsheet data at runtime in the present invention. In a preferred embodiment, 'MyWorkbook' book is an object-oriented software class that is derived from KDJWorkbook. The source code of this class is generated by the Parser and Code Generator to represent the global data and behavior aspects of a specific body of spreadsheet data. In a preferred embodiment, 'MyWorkbook' is derived from the name of a spreadsheet workbook, so if the spreadsheet workbook's name is 'Financials' then the name of the generated class is 'Financialsbook'. A singleton instance of 'MyWorkbook' book is instantiated at runtime.

| Field | |
|---|---|
| Description | |
| 'myWorksheet1'sheet | An instantiation of the generated source code containing the values and formulas in 'myWorksheetN'sheet myWorksheet1. |
| Method | |
| <<Constructor>> | Sets the default active KDJWorksheet instance and adds all of the named KDJCell instances and KDJRange instances KDJWorkbook.Names. |

KDJWorksheet is a software Data Structure that represents the aspects of a single spreadsheet sheet within a body of spreadsheet data. In background art spreadsheet applications and components, these are commonly referred to as 'worksheet' or 'sheet'. In the present invention, KDJWorksheet is a software Data Structure and functions defined in the target software development language that together represent the general data and behavior aspects of a of a single spreadsheet sheet at runtime. In a preferred embodiment, KDJWorksheet is an object-oriented software class from which classes representative of specific spreadsheet sheets are derived. KDJWorksheet is not instantiated at runtime.

| Field | |
|---|---|
| Description | |
| sheetName | The name of the spreadsheet sheet represented by the KDSheet instance. |
| sheetIndex | The one-based index of the spreadsheet sheet represented by the KDSheet instance. |
| columns | A collection of data structures representing the columns of the spreadsheet. Each representative column comprises a collection of data structures that represent the rows in the column data. |
| Method | |
| addCellReference | A method which takes in a reference to an instance of KDJCell and row and column identifiers to add the reference to the KDJWorksheet.columns collection. |
| getCell | A method which takes in row and column identifiers and returns a reference to the KDJCell instance at that location. |
| getRange | A method which takes in top left row, top left column, bottom right row, bottom right column identifiers and returns a reference to the KDJRange instance at that location. |
| getValue | A method which takes in a native-type value such as a double, Boolean, or String and returns a KDJValue instance initialized to the input value. |
| getCellValue | A method which takes in row and column identifiers to return the KDJValue instance representing the value of the referenced KDJCell instance. |
| rowColToA1 | A method that takes in row and column identifiers and returns a String representing the row and column in A1 notation. For example, the call rowColToA1(1, 1) would return the string "A1". |

'MyWorkbook' book is a software Data Structure and functions defined in the target software development language that together represent data and behavior aspects of a specific spreadsheet sheet at runtime in the present invention. In a preferred embodiment, 'MyWorksheet' sheet is an object-oriented software class that is derived from KDJWorksheet. The source code of this class is generated by the Parser and Code Generator to represent the data and behavior aspects of a specific spreadsheet sheet. In a preferred embodiment, 'MyWorksheet' is derived from the name of a spreadsheet sheet, so if the spreadsheet sheet is named 'Revenue' then the name of the generated class would be 'Revenuesheet.' An instance of 'MyWorksheet' sheet is instantiated at runtime for each spreadsheet sheet in the spreadsheet workbook.

| Field | |
|---|---|
| Description | |
| 'MyWorksheet'book | A reference to the instance of KDJBook that represents the global aspects of the body of spreadsheet data. |
| A1 | A reference to the KDJCell instance at row, column location 1, 1 . . . with the specified initial value. For example, if the represented IVN spreadsheet sheet contains a cell B3 that contains a literal value rather than a cell formula, then the representative 'MyWorksheet'sheet class will have a member 'B3' of type KDJCell. |
| Method | |
| <<Constructor>> | Creates the parent-child relationship between the KDJWorkbook and KDJWorksheet. |
| B1e | A method which representing the formula contained in the cell and returns a resultant Value instance. For example, if the represented IUNe spreadsheet sheet contains a cell B4 that contains a cell formula rather than a literal value, then the representative 'MyWorksheet'sheet class will have a member method 'B4e' that returns an instance of KDJValue. |

KDJCell is a software Data Structure and functions defined in the target software development language that together represent data and behavior aspects of a spreadsheet cell at runtime in the present invention. In a preferred embodiment, KDJCell is an object-oriented software class. Source code declaring a static instance of this class is generated by the present invention to represent the data aspects of each spreadsheet cell that contains a literal value rather than a cell formula. Instances of KDJCell are instantiated at runtime by the present invention to represent data and behavior aspects of each spreadsheet cell that contains a cell formula rather than a literal value.

| Field | |
|---|---|
| Description | |
| Sheet | A reference to the instance of 'MyWorksheet'sheet that represents the aspects of the spreadsheet sheet which contains the spreadsheet cell represented by the current instance of KDJCell. |
| Row | Read-only property containing the row of the represented spreadsheet cell. |

| Field | |
|---|---|
| Col | Read-only property containing the column of the represented spreadsheet cell. |
| value | A reference to a KDJValue object that stores the text, numeric, Boolean, or error values for a cell. |
| persistent | An indicator of whether the current instance of KDCell should be marked as persistable. |
| hasFormula | An indicator of whether or not the cell has a formula associated with it. |
| dirtyCount | A numeric counter that keeps track of the cell's state. If the count on the cell is not equal to the dirtyCount on the workbook, then the formula attached to the cell must be recalculated. |
| Method | |
| getValue | A method which returns the KDJValue of the KDJCell instance. If the KDJCell's dirtyCount is not equal to the dirtyCount on the KDJWorkbook, then the formula is recalculated on request, otherwise, a cached result is returned. |
| setValue | Sets the value reference of the KDJCell instance. |
| clear | A method which clears the KDJCell's value. |
| getText | A method which returns the text representation of the KDJCell's KDJValue. |
| setText | A method that takes in a string and sets the KDJCell's KDJValue to the input string. |
| getNumber | A method which returns the numeric (double) representation of the KDJCell's KDJValue. |
| setNumber | A method that takes in a number (double) and sets the KDJCell's KDJValue to the input number. |
| getLogical | A method which returns the Boolean representation of the KDJCell's KDJValue. |
| setLogical | A method that takes in a Boolean and sets the KDJCell's KDJValue to the input Boolean value. |
| getError | A method which returns the Error representation of the KDJCell's KDJValue. |

KDJRange is a software Data Structure and functions defined in the target software development language that together represent data and behavior aspects of a range of spreadsheet cells within a spreadsheet sheet. In a preferred embodiment, KDJRange is an object-oriented software class. Instances of KDJRange are instantiated at runtime.

| Field | |
|---|---|
| Description | |
| topLeftRow | An identifier of the location of the KDJRange instance's top left row. |
| topLeftColumn | An identifier of the location of the KDJRange instance's top left column. |
| bottomRightRow | An identifier of the location of the KDJRange instance's bottom right row. |
| bottomRightColumn | An identifier of the location of the KDJRange instance's bottom right column. |
| type | An indicator of whether the represented spreadsheet name refers to a single spreadsheet cell or a range of spreadsheet cells. One of cellType, verticalVectorType, horizontalVectorType, matrixType. |

| Field | |
|---|---|
| Method | |
| equals | A method which takes in two references to KDJRange instances and compares them for equality. |

KDJValue is a software Data Structure and functions defined in the target software development language that together represent data and behavior aspects of a KDJCell's value evaluation, whether the cell contains a literal value or a cell formula. KDJValue is also used to represent the results of built-in spreadsheet functions and user-defined functions. In a preferred embodiment, KDJValue is an object-oriented software class. Instances of KDJValue are instantiated at runtime.

| Field | |
|---|---|
| Description | |
| number | A number (double) which stores the numeric representation of the KDJValue. |
| text | A string which stores the text representation of the KDJValue. |
| bool | A Boolean which stores the Boolean representation of the KDJValue. |
| error | A KDJException which stores an Errors associated with the KDJValue if there is one. |
| lastSet | An indicator that represents what type of value that was last set. One of noneType, numberType, textType, booleanType, or errorType. |
| LogicalValue | An indicator which stores whether the KDJValue represents a Boolean value or not. |
| reference | An indicator which stores whether the KDJValue is a reference to a KDJCell's KDJValue or not. |
| Method | |
| compareTo | A method that takes in a KDJValue and performs a comparison of the current instance of the KDJValue with another. It attempts to perform a numeric comparison and returns −1 if the parameter is less than the value, 0 is if it is equal to, or 1 if it is greater than. If it cannot perform a numeric or Boolean comparison, it performs a lexicographical comparison of the strings based on Unicode character values. |
| clone | A method which makes a duplicate KDJValue object in a new memory space. |

KDJCalcException is a software Data Structure and functions that represent aspects of an Exception. In a preferred embodiment, KDJCalcException is an object-oriented software class. Instances of KDJCalcException are instantiated at runtime when an error occurs as the result of any unexpected conditions.

| Field | |
|---|---|
| Description | |
| type | An indicator that tells which type of error has occurred. The error types are NULL_ERR, DIV0_ERR, VALUE_ERR, REF_ERR, NAME_ERR, and NA_ERR. |
| Method | |
| | In a preferred embodiment, KDJCalcException has no member methods. |

KDJExpressionParser is a software Data Structure and functions that represent the aspects of an expression parser for use by run-time implementations of built-in spreadsheet functions and user-defined functions that can take quoted regular expressions as arguments. In a preferred embodiment, KDJExpressionParser is an object-oriented software class. Instance of KDJExpressionParser are instantiated at runtime during evaluation of functions such as 'SUMIF' and 'COUNTIF', for example.

| Field | |
|---|---|
| Description | |
| compVal | A KDJValue instance which stores the value that is going to be compared. |
| comparison | The type of comparison being done, EQUAL, NOT_EQUAL, LESS_THAN, LESS_OR_EQUAL, GREATER_THAN, or GREATER_OR_EQUAL. |
| Method | |
| <<Constructor>> | A constructor that takes in a KDJValue object containing a string which has a comparison operator and a value for example ">=4". GREATER_OR_EQUAL becomes the comparison and compVal is 4. |
| compareTo | Compares the KDJValue instance to the compVal based on the comparison criteria and returns true if the criteria are met. |

KDJFunctionLibrary is a set of functions defined in the target software development language that represent behavior aspects necessary for execution of built-in spreadsheet functions. In a preferred embodiment, KDJFunctionLibrary is an object-oriented software class. All member functions of KDJFunctionLibrary are static and require no instantiation. In a preferred embodiment, KDJFunctionLibrary can be generated and only include implementations of the built-in spreadsheet functions actually used in the specific workbook for which code is generated. This serves to optimize the generated code for size. The entire library of built-in spreadsheet functions can be used if the Calculation Engine is to be shared by modules representing several workbooks, where the used functions may not be known at code-generation-time.

Note: The following list of built-in spreadsheet functions and descriptions contemplated by the invention is in spreadsheet syntax format as defined within the Help System of Microsoft® Excel 2000, a background art spreadsheet application.

| Description | Field |
|---|---|
| <<none>> | In a preferred embodiment, KDJFunctions has no fields. |
| Method | Operators: |
| + | Addition operator, returns the result of adding a number to a number. |
| − | Subtraction operator, returns the result of a number subtracted from another number. |
| * | Multiplication operator, returns the result of multiplying a number by a number. |
| / | Division operator, returns the result of a number divided by a number. |
| #$^b$ | Raise-to-the-power operator, returns the result of a number raised to a power |
| % | Percent operator, returns the percent of a number (the number multiplied by 0.01). |
| = | Equivalence comparator compares two values and returns TRUE if they are exactly the same, FALSE otherwise |
| > | Greater-than comparator, compares two values and returns TRUE if value 1 is greater than value 2, FALSE otherwise |
| < | Less-than comparator, compares two values and returns TRUE if value 1 is less than value 2, FALSE otherwise |
| >= | Greater-than-or-equal-to comparator, compares two values and returns TRUE if value 1 is greater than or equal to value 2, FALSE otherwise |
| <= | Less-than-or-equal-to comparator, compares two values and returns TRUE if value 1 is less than or equal to value 2, FALSE otherwise |
| <> | Not-equal comparator, compares two values and returns FALSE if the values are equal, TRUE otherwise |
| & | String join operator, joins two text strings into one text string and returns this string |
|  | Functions: |
| ABS | Returns the absolute value of a number |
| ACOS | Returns the arccosine of a number |
| ACOSH | Returns the inverse hyperbolic cosine of a number |
| ADDRESS | Creates a cell address as text, given the specified row and column numbers |
| AND | Returns TRUE if all arguments are true; otherwise, returns FALSE if one argument is false. |
| AREAS | Returns the number of areas in a reference |
| ASIN | Returns the arcsine of a number |
| ASINH | Returns the inverse hyperbolic sine of a number |
| ATAN | Returns the arctangent of a number |
| ATAN2 | Returns the arctangent from x- and y-coordinates |
| ATANH | Returns the inverse hyperbolic tangent of a number |
| AVEDEV | Returns the average of the absolute deviations of the list of arguments |
| AVERAGE | The average of the values in a list. |
| AVERAGEA | Mean with text treated as 0 except TRUE = 1 |
| BETADIST | Returns the cumulative beta probability density function according to the specified parameters |
| BETAINV | Returns the inverse of the cumulative beta probability density function |
| BINOMDIST | Returns the individual term binomial distribution probability |
| CALL | Calls a procedure in a dynamic link library or code resource. |
| CEILING | Rounds a number to the nearest integer or to the nearest multiple of significance |
| CELL | Returns information about the formatting, location, or contents of the upper-left cell in a reference |
| CHAR | Returns the character specified by a number |
| CHIDIST | Returns the one-tailed probability of the chi-squared distribution |
| CHIINV | Returns the inverse of the one-tailed probability of the chi-squared distribution |
| CHITEST | Returns the value from the chi-squared (.gamma.2) distribution for the statistic and the appropriate degrees of freedom |
| CHOOSE | Return the value specified by index number from the list of value arguments |
| CLEAN | Removes all nonprintable characters from text |

| | |
|---|---|
| CODE | Returns a numeric code, which corresponds to the character set used by your computer, for the first character in a text string |
| COLUMN | Returns the column number of the given reference |
| COLUMNS | Returns the number of columns in an array or reference |
| COMBIN | Returns the number of combinations for a given number of objects |
| CONCATENATE | Joins several text strings into one text string and returns this string |
| CONFIDENCE | Returns the confidence interval for a population mean |
| CORREL | Returns the correlation coefficient of the array1 and array2 cell ranges |
| COS | Returns the cosine of a number |
| COSH | Returns the hyperbolic cosine of a number |
| COUNT | The number of items in a list. This is the default function for nonnumeric data. |
| COUNTA | Counts the number of cells that are not empty and the values within the list of arguments |
| COUNTBLANK | Counts empty cells in a specified range of cells |
| COUNTIF | Counts the number of nonblank cells within a range that meet the given criteria |
| COVAR | Returns covariance, the average of the products of deviations for each data point pair in two data sets |
| CRITBINOM | Returns the smallest value for which the cumulative binomial distribution is greater than or equal to a criterion value |
| DATE | Returns the serial number that represents a particular date |
| DATEVALUE | Returns the serial number of the date represented by the text argument |
| DAVERAGE | Returns the average of selected database entries |
| DAY | Returns the day of a date, represented by a serial number |
| DAYS360 | Returns the number of days between two dates based on a 360-day year (twelve 30-day months) |
| DB | Returns the depreciation of an asset for a specified period using the fixed-declining balance method. |
| DCOUNT | Counts the cells that contain numbers in a database |
| DCOUNTA | Counts nonblank cells in a database |
| DDB | Returns the depreciation of an asset for a specified period using the double-declining balance method or some other method you specify. |
| DEGREES | Converts radians into degrees. |
| DEVSQ | Returns the sum of squares of deviations of the arguments from their sample mean |
| DGET | Extracts from a database a single record that matches the specified criteria |
| DMAX | Returns the maximum value from selected database entries |
| DMIN | Returns the minimum value from selected database entries |
| DOLLAR | Converts a number to text using currency format, with the decimals rounded to the specified place |
| DPRODUCT | Multiplies the values in a particular field of records that match the criteria in a database |
| DSTDEV | Estimates the standard deviation based on a sample of selected database entries |
| DSTDEVP | Calculates the standard deviation based on the entire population of selected database entries |
| DSUM | Adds the numbers in the field column of records in the database that match the criteria |
| DVAR | Estimates variance based on a sample from selected database entries |
| DVARP | Calculates variance based on the entire population of selected database entries |
| ERRORTYPE | Returns a number corresponding to one of the error values in KDJCalcException or returns the #N/A error if no error exists for the argument value |
| EVEN | Rounds a number up to the nearest even integer |
| EXACT | Compares two text strings and returns TRUE if they are exactly the same, FALSE otherwise EXP Returns e raised to the power of a given number |
| EXPONDIST | Returns the exponential distribution of a function |
| FACT | Returns the factorial of a number |
| FACTDOUBLE | Returns the double factorial of a number FALSE Returns the logical value FALSE |
| FDIST | Returns the F probability distribution |
| FINV | Returns the inverse of the F probability distribution |
| FISHER | Returns the Fisher transformation at x |

-continued

| | |
|---|---|
| FISHERINV | Returns the inverse of the Fisher transformation |
| FIND | finds one text string (the first argument) within another text string (the second argument), and returns the number of the starting position of the first argument, from the first character of the second argument |
| FIXED | Rounds a number to the specified number of decimals, formats the number in decimal format either using or not using a period and commas, and returns the result as text |
| FLOOR | Rounds a number down, towards zero, to the nearest multiple of significance |
| FORECAST | Calculates, or predicts, a future value by using existing values |
| FREQUENCY | Calculates how often values occur within a range of values, and then returns a vertical array of numbers |
| FTEST | Returns the result of an F-test on the two array arguments FV Returns the future value of an investment based on periodic, constant payments and a constant interest rate |
| GAMMADIST | Returns the gamma distribution |
| GAMMAINV | Returns the inverse of the gamma cumulative distribution |
| GAMMALN | Returns the natural logarithm of the gamma function, .GAMMA.(x), on argument x |
| GCD | Returns the greatest common divisor |
| GEOMEAN | Returns the geometric mean of an array or range of positive data |
| GETPIVOTDATA | Returns data stored in a PivotTable |
| GROWTH | Calculates predicted exponential growth by using existing data |
| HARMEAN | Returns the harmonic mean of a data set |
| HLOOKUP | Searches for the first argument value in the top row of the specified table or array of values, and then returns a value in the same column from a row you specify in the table or array |
| HOUR | Returns the hour, in integer format ranging from 0 to 23, of a time value |
| HYPGEOMDIST | Returns the probability of a given number of sample successes, given the sample size, population successes, and population size |
| IF | Returns 1st value if True, otherwise returns logical value FALSE |
| IF | Returns 1st value if True, otherwise returns 2nd Value |
| INDEX | Returns the value of a specified cell or array of cells within array |
| INDEX | Returns the value of a specified cell or array of cells within array INDEX Returns a reference to a specified cell or cells within reference |
| INDIRECT | Returns the reference specified by the argument text string |
| INFO | Returns information about the formatting, location, or contents of the upper-left cell in a reference |
| INT | Rounds a number down to the nearest integer |
| INTERCEPT | Calculates the point at which a line will intersect the y-axis by using existing x-values and y-values |
| IPMT | Returns the interest payment for a given period for an investment based on periodic, constant payments and a constant interest rate |
| IRR | Returns the internal rate of return for a series of cash flows represented by the numbers in the values of the argument |
| ISBLANK | Returns the logical value TRUE if the argument is a reference to an empty cell; otherwise it returns FALSE |
| ISERR | Returns the logical value TRUE if the argument is a reference to any error value except #N/A; otherwise it returns FALSE |
| ISERROR | Returns the logical value TRUE if the argument is a reference to any error value; otherwise it returns FALSE |
| ISLOGICAL | Returns the logical value TRUE if the argument is a reference to a logical value; otherwise it returns FALSE |
| ISNA | Returns the logical value TRUE if the argument is a reference to the #N/A error value; otherwise it returns FALSE |

| | |
|---|---|
| ISNONTEXT | Returns the logical value TRUE if the argument is a reference to any item that is not text; otherwise it returns FALSE |
| ISNUMBER | Returns the logical value TRUE if the argument is a reference to a number; otherwise it returns FALSE |
| ISPMT | Calculates the interest paid during a specific period of an investment |
| ISREF | Returns the logical value TRUE if the argument is a reference to a reference; otherwise it returns FALSE |
| ISTEXT | Returns the logical value TRUE if the argument is a reference to text; otherwise it returns FALSE |
| KURT | Returns kurtosis of a data set. |
| LARGE | Returns the k-th largest value in a data set, where the data set is specified by the first argument and the value of k by the second argument |
| LCM | Returns the least common multiple |
| LEFT | Returns the first character or characters in the argument text string, based on the number of characters you specify |
| LEN | Returns the number of characters in the argument text string |
| LINEST | Calculates the statistics for a line by using the "least squares" method to calculate a straight line that best fits your data, and returns an array that describes the line |
| LN | Returns the natural logarithm of a number. |
| LOG | Returns the logarithm of a number to the base 10 |
| LOG | Returns the logarithm of a number to a specified base |
| LOG10 | Returns the base-10 logarithm of a number |
| LOGEST | Calculates an exponential curve that fits your data and returns an array of values that describes the curve |
| LOGINV | Returns the inverse of the lognormal cumulative distribution function of x, where ln(x) is normally distributed with parameters mean and standard dev |
| LOGNORMDIST | Returns the cumulative lognormal distribution of x, where ln(x) is normally distributed with parameters mean and standard_dev |
| LOOKUP | Returns value from one-row, one-col range or an array. |
| LOOKUP | Looks in a one-row or one-column range (known as a vector) for a value and returns a value from the same position in a second one-row or one-column range |
| LOWER | Converts all uppercase letters in the argument text string to lowercase |
| MATCH | Returns the relative position of an item in an array that matches a specified value in a specified order |
| MAX | Returns the largest value in a set of values. Ignores logical values and text. |
| MAXA | Returns the largest value in a set of values. Does not ignore logical values and text. |
| MDETERM | Returns the matrix determinant of an array |
| MEDIAN | Returns the median of the given numbers |
| MID | Returns a specific number of characters from the argument text string, starting at the specified position, based on the specified number of characters |
| MIN | Returns the smallest value in a set of values. Ignores logical values and text. |
| MINA | Returns the smallest value in a set of values. Does not ignore logical values and text. |
| MINUTE | Returns the minutes, in integer format ranging from 0 to 59, of a time value |
| MINVERSE | Returns the matrix inverse of an array |
| MIRR | Returns the modified internal rate of return for a series of periodic cash flows |
| MMULT | Returns the matrix product of two arrays |
| MOD | Returns the remainder from division |
| MODE | Returns the most frequently occurring value in an array or range of data |
| MONTH | Returns the month, in integer format ranging from 0 to 12, of a date represented by a serial number |
| MROUND | Returns a number rounded to the desired multiple |
| MULTINOMIAL | Returns the multinomial of a set of numbers N Returns a value converted to a number NA Returns the error value #N/A |
| NEGBINOMDIST | Returns the probability that there will be number_f failures before the number_s-th success, when the constant probability of a success is probability_s |
| NORMDIST | Returns the normal cumulative distribution of the argument value for the specified mean and standard deviation |

| | |
|---|---|
| NORMINV | Returns the inverse of the normal cumulative distribution for the specified mean and standard deviation |
| NORMSDIST | Returns the standard normal cumulative distribution function for a value |
| NORMSINV | Returns the inverse of the standard normal cumulative distribution NOT Reverses the value of its argument NOW Returns the serial number of the current date and time |
| NPER | Returns the number of periods for an investment based on periodic, constant payments and a constant interest rate |
| NPV | Calculates the net present value of an investment by using a discount rate and a series of future payments (negative values) and income (positive values) |
| ODD | Rounds a number up to the nearest odd integer |
| OFFSET | Returns a reference to a range that is a specified number of rows and columns from a cell or range of cells |
| OFFSET | Returns a reference to a range that is a specified number of rows and columns from a cell or range of cells and has a specified height |
| OFFSET | Returns a reference to a range that is a specified number of rows and columns from a cell or range of cells and has a specified height and width |
| OR | Returns TRUE if any argument is TRUE; returns FALSE if all arguments are FALSE |
| PEARSON | Returns the Pearson product moment correlation coefficient given two data sets |
| PERCENTILE | Given a data range and a value k, returns the k-th percentile of values in the range |
| PERCENTRANK | Returns the rank of a value in a data set as a percentage of the data set |
| PERMUT | Returns the number of permutations for a given number of objects that can be selected from number objects PI Returns the value of Pi |
| PMT | Calculates the payment for a loan based on constant payments and a constant interest rate |
| POISSON | Returns the Poisson distribution |
| POWER | Returns the result of a number raised to a power |
| PPMT | Returns the payment on the principal for a given period for an investment based on periodic, constant payments and a constant interest rate |
| PROB | Returns the probability that values in a range are between two limits |
| PRODUCT | Multiplies its arguments |
| PROPER | Capitalizes the first letter in the given text string and any other letters in the text that follow any character other than a letter. Converts all other letters to lowercase letters |
| PV | Returns the present value of an investment |
| QUARTILE | Returns the specified quartile of a data set |
| QUOTIENT | Returns the integer portion of a division |
| RADIANS | Converts degrees to radians |
| RAND | Returns a random number between 0 and 1 |
| RANDBETWEEN | Returns a random number between the numbers you specify |
| RANK | Returns the rank of a number in a list of numbers |
| RATE | Returns the interest rate per period of an annuity |
| REPLACE | Replaces part of a text string, based on the number of characters you specify, with a different text string |
| REPT | Returns the given text repeated the specified number of times |
| RIGHT | Returns the last character or characters in a text string, based on the number of characters you specify |
| ROMAN | Converts an Arabic numeral to roman, as text |
| ROUND | Rounds a number to a specified number of digits |
| ROUNDDOWN | Rounds a number down, toward zero |
| ROUNDUP | Rounds a number up, away from zero |
| ROW | Returns the row number of a reference |
| ROWS | Returns the number of rows in a reference or array |
| RSQ | Returns the square of the Pearson product moment correlation coefficient through data points in the specified ranges of data points |
| SEARCH | Returns the number of the character at which a specific character or text string is first found, beginning with the specified number |
| SECOND | Returns the seconds of a time value |
| SERIESSUM | Returns the sum of a power series based on the formula |

| | -continued |
|---|---|
| SIGN | Returns the sign of a number |
| SIN | Returns the sine of the given angle |
| SINH | Returns the hyperbolic sine of a number |
| SKEW | Returns the skewness of a distribution |
| SLN | Returns the straight-line depreciation of an asset for one period |
| SLOPE | Returns the slope of the linear regression line through data points in the specified ranges of data points |
| SMALL | Given a data set and a value k, returns the k-th smallest value in the data set |
| SQRT | Returns a positive square root SQRTPI Returns the square root of (number * Pi) |
| STANDARDIZE | Returns a normalized value from a distribution characterized by mean and standard deviation |
| STDEV | Estimates standard deviation based on a sample |
| STDEVA | Estimates standard deviation based on a sample, and includes all text and logical values in its calculation |
| STDEVP | Calculates standard deviation based on the entire population given as arguments |
| STDEVPA | Calculates standard deviation based on the entire population given as arguments, including text and logical values |
| STEYX | Given a range of dependent data points(y's) and a range of independent data points(x's), returns the standard error of the predicted y-value for each x in the regression |
| SUBSTITUTE | Substitutes new text for old text in a given text string |
| SUBTOTAL | Returns a subtotal in a list or database |
| SUM | The sum of the values in a list. This is the default function for numeric data. |
| SUMIF | Adds the cells specified by a given criteria |
| SUMIF | Adds the cells coinciding with the cells specified by a given criteria |
| SUMPRODUCT | Returns the sum of the products of corresponding array components |
| SUMSQ | Returns the sum of the squares of the arguments |
| SUMX2MY2 | Returns the sum of the difference of squares of corresponding values in two arrays |
| SUMX2PY2 | Returns the sum of the sum of squares of corresponding values in two arrays |
| SUMXMY2 | Returns the sum of squares of differences of corresponding values in two arrays |
| SYD | Returns the sum-of-years' digits depreciation of an asset for a specified period T Returns the text referred to by the given value TAN Returns the tangent of a number |
| TANH | Returns the hyperbolic tangent of a number |
| TDIST | Returns the Percentage Points (probability) for the Student t-distribution where a numeric value (x) is a calculated value of t for which the Percentage Points are to be computed |
| TEXT | Converts a given value to text in a specific number format |
| TIME | Returns the decimal number for a particular time represented by an hour, minute, and second value |
| TIME VALUE | Returns the decimal number of the time represented by a text string |
| TINV | Returns the t-value of the Student's t-distribution as a function of the probability and the degrees of freedom |
| TODAY | Returns the serial number of the current date |
| TRANSPOSE | Returns a vertical range of cells as a horizontal range, or vice versa |
| TREND | Fits a straight line (using the method of least squares) to the given arrays of y-values and x-values. Returns the y-values along that line for the array of new x values that you specify |
| TRIM | Truncates a number to an integer by removing the fractional part of the number |
| TRIMMEAN | Returns the mean of the interior of a data set |
| TRUE | Returns the logical value TRUE |
| TRUNC | Truncates a number to an integer |
| TTEST | Returns the probability associated with a Student's t-Test |
| TYPE | Returns the type of a value |
| UPPER | Converts the given text to uppercase |
| VALUE | Converts a text string that represents a number into a number. VAR Estimates variance based on a sample |

| | -continued |
|---|---|
| VARA | Estimates variance based on a sample, and includes all text and logical values in its calculation |
| VARP | Calculates variance based on the entire population given as arguments |
| VARPA | Calculates variance based on the entire population given as arguments, including text and logical values |
| VDB | Returns the depreciation of an asset for any period you specify, including partial periods, using the double-declining balance method or some other method you specify |
| VLOOKUP | Searches for a value in the leftmost column of a table, and then returns a value in the same row from a column you specify in the table |
| VLOOKUP | Searches for a value in the leftmost column of a table, and then returns a value in the same row from a column you specify in the table. If range_lookup is FALSE, an exact match will be found. If range_lookup is TRUE, an approximate match will be found. WEEKDAY Returns the day of the week corresponding to a given date |
| WEIBULL | Returns the Weibull distribution YEAR Returns the year corresponding to a given date |
| ZTEST | Returns the two-tailed P-value of a z-test |

Some background art spreadsheet applications and spreadsheet components allow users to define functions that are not built-in. KDJUserDefinedFunctionLibrary is a set of functions defined in the target software development language that represent behavior aspects necessary for execution of user-defined spreadsheet functions. In a preferred embodiment, KDJUserDefinedFunctionLibrary is an object-oriented software class. KDJUserDefinedFunctionLibrary allows unanticipated functions to be made available for use in KDJ-Cell formulas. All member functions of KDJUserDefinedFunctionLibrary must be defined as static and require no instantiation. In a preferred embodiment, KDJUserDefinedFunctionLibrary can be generated and only include implementations of the user-defined spreadsheet functions actually used in the specific workbook for which code is generated. This serves to optimize the generated code for size. The entire library of user-defined spreadsheet functions can be used if the Calculation Engine is to be shared by modules representing several workbooks, where the used functions may not be known at code-generation-time.

| Field | |
|---|---|
| Description | |
| <<none>> | In a preferred embodiment, KDJUserDefinedFunctionLibrary has no fields. |
| Method | |
| DollarToWords | A function for converting a currency amount to a word representation for use in printing checks. For example, (123.45) would return 'One Hundred Twenty Three Dollars and Forty Five Cents'. . . . A multitude of unanticipated user-defined functions can be defined and made available for use by KDJCell formulas. |

We claim:

1. A computer implemented method of executing computations representative of a spreadsheet, the method comprising:

receiving, by a processor, a request to load data representative of spreadsheet data;

instantiating, by the processor, in response to the received load request, at least one instance of a data structure representative of each of at least one cell from the spreadsheet data, the data structure having been generated from information extracted from the spreadsheet data and transformed into a representation of the spreadsheet data, each of the at least one instance of the data structure representative of each of the at least one cell from the spreadsheet data having a value associated therewith, the value comprising one of a literal value or a computed value;

receiving, by the processor, a request for a result representative of the result of a cell from the spreadsheet data;

locating, by the processor, in response to the result request, the instance of the data structure representative of the cell from the spreadsheet data and the value associated therewith; and wherein, if the located value comprises a literal value, returning, by the processor, the located value in response to the result request; and further wherein, if the located value comprises a computed value, computing, by the processor, any values on which the located value necessarily depends, if necessary, prior to computing the located value based thereon and returning, by the processor, the computed located value in response to the result request;

wherein the computed value is characterized as one of dirty or not dirty and further wherein, if the located value comprises a computed value and the computed value is not dirty, returning, by the processor, the located value without computing any values on which the located value necessarily depends.

2. The computer implemented method of claim 1 further comprising:

instantiating, by the processor in response to the received load request, an instance of a workbook data structure representative of a workbook from the spreadsheet data, and at least one instance of a worksheet data structure representative of a worksheet from the spreadsheet data.

3. The computer implemented method of claim 2 wherein the instance of a workbook data structure represents global data behavior aspects of the workbook from the spreadsheet data and each of the at least one instance of a worksheet data structure represents global data behavior aspects of each worksheet from the spreadsheet data.

4. The computer implemented method of claim 1 wherein each instance of the data structure representative of a cell from the spreadsheet data represents data and behavior aspects of each cell that contains one of a literal value or formula.

5. The computer implemented method of claim 1 wherein the instances of the data structure representative of a cell from the spreadsheet that represent data and behavior aspects of each cell that contains a formula are instantiated at runtime.

6. The computer implemented method of claim 1 further comprising:
instantiating a value data structure corresponding to each instance of the data structure representative of a cell from the spreadsheet data, each value data structure operative to store the associated value.

7. The computer implemented method of claim 1 wherein each associated value comprises a value referenced by the data structure representative of the cell from the spreadsheet data.

8. The computer implemented method of claim 1 wherein each associated value comprises one of text, number, formula, Boolean, exception, date, or combinations thereof.

9. The computer implemented method of claim 1 further comprising:
instantiating a name data structure representative of a name from the spreadsheet data referring to at least one cell from the spreadsheet data.

10. The computer implemented method of claim 1 wherein the at least one cell from the spreadsheet data comprises a range of cells from the spreadsheet data.

11. The computer implemented method of claim 1 wherein the instantiating, receiving, locating, computing and returning are performed independent of a spreadsheet application.

12. The computer implemented method of claim 1 wherein the instantiating, receiving, locating, computing and returning are performed are optimized for the platform upon which they are performed.

13. The computer implemented method of claim 1 wherein the computing further comprises accessing a function library.

14. The computer implemented method of claim 13 wherein the function library only includes implementations of functions actually used in the spreadsheet data.

15. A system for execution of computations representative of a spreadsheet, the system comprising:
a processor operative to receive a request to load data representative of spreadsheet data;
the processor, in response to the received load request, being further operative to instantiate at least one instance of a data structure representative of each of at least one cell from the spreadsheet data, the data structure having been generated from information extracted from the spreadsheet data and transformed into a representation of the spreadsheet data, each of the at least one instance of the data structure representative of each of the at least one cell from the spreadsheet data having a value associated therewith, the value comprising one of a literal value or a computed value;
the processor being further operative to receive a request for a result representative of the result of a cell from the spreadsheet data;
the processor, in response to the result request, being further operative to locate the instance of the data structure representative of the cell from the spreadsheet data and the value associated therewith; and
wherein, if the located value comprises a literal value, the processor being further operative to return the located value in response to the result request; and
further wherein, if the located value comprises a computed value, the processor being further operative to compute any values on which the located value necessarily depends, if necessary, prior to computing the located value based thereon and returning, by the processor, the computed located value in response to the result request;
wherein the computed value is characterized as one of dirty or not dirty and further wherein, if the located value comprises a computed value and the computed value is not dirty, returning, by the processor, the located value without computing any values on which the located value necessarily depends.

16. The system of claim 15 wherein the processor, in response to the received load request, is further operative to instantiate an instance of a workbook data structure representative of a workbook from the spreadsheet data, and at least one instance of a worksheet data structure representative of a worksheet from the spreadsheet data.

17. The system of claim 16 wherein the instance of a workbook data structure represents global data behavior aspects of the workbook from the spreadsheet data and each of the at least one instance of a worksheet data structure represents global data behavior aspects of each worksheet from the spreadsheet data.

18. The system of claim 15 wherein each instance of the data structure representative of a cell from the spreadsheet data represents data and behavior aspects of each cell that contains one of a literal value or formula.

19. The system method of claim 15 wherein the instances of the data structure representative of a cell from the spreadsheet that represent data and behavior aspects of each cell that contains a formula are instantiated at runtime.

20. The system method of claim 15 wherein the processor is further operative to instantiate a value data structure corresponding to each instance of the data structure representative of a cell from the spreadsheet data, each value data structure operative to store the associated value.

21. The system of claim 15 wherein each associated value comprises a value referenced by the data structure representative of the cell from the spreadsheet data.

22. The system of claim 15 wherein each associated value comprises one of text, number, formula, Boolean, exception, date, or combinations thereof.

23. The system method of claim 15 wherein the processor is further operative to instantiate a name data structure representative of a name from the spreadsheet data referring to at least one cell from the spreadsheet data.

24. The system of claim 15 wherein the at least one cell from the spreadsheet data comprises a range of cells from the spreadsheet data.

25. The system of claim 15 wherein the processor is operative to perform the instantiation, reception, location, computation and return independent of a spreadsheet application.

26. The system of claim 15 wherein the processor is further operative to perform the computation by accessing a function library.

27. The system of claim 26 wherein the function library only includes implementations of functions actually used in the spreadsheet data.

28. A computer implemented system for executing computations representative of a spreadsheet, the system comprising:

means for receiving a request to load data representative of spreadsheet data;

means for instantiating in response to the received load request, at least one instance of a data structure representative of each of at least one cell from the spreadsheet data, the data structure having been generated from information extracted from the spreadsheet data and transformed into a representation of the spreadsheet data, each of the at least one instance of the data structure representative of each of the at least one cell from the spreadsheet data having a value associated therewith, the value comprising one of a literal value or a computed value;

means for receiving a request for a result representative of the result of a cell from the spreadsheet data;

means for locating in response to the result request, the instance of the data structure representative of the cell from the spreadsheet data and the value associated therewith; and means for, wherein, if the located value comprises a literal value, returning the located value in response to the result request; and further means for, wherein, if the located value comprises a computed value, computing any values on which the located value necessarily depends, if necessary, prior to computing the located value based thereon and returning, by the processor, the computed located value in response to the result request;

wherein the computed value is characterized as one of dirty or not dirty and further wherein, if the located value comprises a computed value and the computed value is not dirty, returning, by the processor, the located value without computing any values on which the located value necessarily depends.

* * * * *